(12) United States Patent
Bostan

(10) Patent No.: US 7,044,422 B2
(45) Date of Patent: May 16, 2006

(54) GYROSTABILIZED SELF PROPELLED AIRCRAFT

(76) Inventor: Nicolae Bostan, 1112 S. Cypress Ave., Ontario, CA (US) 91762

( * ) Notice: Subject to any disclaimer, the term of this patent is extended or adjusted under 35 U.S.C. 154(b) by 4 days.

(21) Appl. No.: 10/390,222

(22) Filed: Mar. 17, 2003

(65) Prior Publication Data

US 2004/0129828 A1 Jul. 8, 2004

Related U.S. Application Data

(63) Continuation of application No. 09/763,714, filed on Feb. 22, 2001, now Pat. No. 6,604,706.
(60) Provisional application No. 60/098,204, filed on Aug. 27, 1998.

(51) Int. Cl.
*B64C 29/00* (2006.01)

(52) U.S. Cl. .................... 244/7 B; 244/12.1; 244/23 R; 244/55
(58) Field of Classification Search ............... 244/6, 244/7 R–7 C, 12.1–12.5, 56, 66, 55, 23 R, 244/23 B, 17.15
See application file for complete search history.

(56) References Cited

U.S. PATENT DOCUMENTS

| | | | |
|---|---|---|---|
| 1,467,515 A | 9/1923 | Stewart | |
| 1,500,572 A | 7/1924 | Brown | |
| 1,820,467 A | 8/1931 | Liska | |
| 1,824,195 A | 9/1931 | Chillingworth | |
| 1,893,936 A | 1/1933 | Eriksson | |
| 2,298,576 A | 10/1942 | McElroy et al. | |
| 2,388,973 A | 11/1945 | Hofgren | |
| 2,874,920 A | 2/1959 | Mallinckrodt | |
| 2,952,442 A | 9/1960 | Warnken | |
| 2,963,272 A | 12/1960 | Welsh | |
| 2,988,308 A | 6/1961 | Czerwinski | |
| D193,122 S | 6/1962 | Walker | |
| 3,112,904 A | 12/1963 | Reams | |
| 3,117,630 A | 1/1964 | Barish | |
| 3,122,342 A | 2/1964 | Weir | |
| 3,176,413 A | 4/1965 | Dornier et al. | |
| 3,193,215 A | 7/1965 | Dunham | |
| 3,273,824 A | 9/1966 | Owens | |
| 3,288,396 A | 11/1966 | Gouin | |
| 3,437,290 A | * 4/1969 | Norman | 244/12.2 |
| 3,458,160 A | 7/1969 | Marchetti | |
| 3,482,803 A | 12/1969 | Lindenbaum | |
| 3,635,426 A | 1/1972 | Stanley | |
| 3,695,780 A | 10/1972 | Velkoff | |
| 3,752,417 A | 8/1973 | Lagace | |
| 3,863,869 A | 2/1975 | Bachman | |
| 4,037,807 A | * 7/1977 | Johnston et al. | 244/7 B |
| 4,076,455 A | 2/1978 | Stargardter | |

(Continued)

*Primary Examiner*—Galen Barefoot
(74) *Attorney, Agent, or Firm*—Christie, Parker & Hale, LLP

(57) ABSTRACT

An unmanned air vehicle comprises a fuselage that defines aerodynamic flight surfaces, an engine mounted to the fuselage having an engine shaft arranged to rotate about a longitudinal axis with respect to the fuselage, and a propeller mounted to the engine shaft so as to rotate to thereby provide thrust. The aircraft also comprises a gyroscopic stabilization member coupled to the shaft such that rotation of the engine shaft results in rotation of the gyroscopic member. Thus, there is more stability during the entire flight envelope. In one embodiment, the gyroscopic stabilization member is comprised of a ring that is attached to the outer ends of the blades of the propeller and the ring is also selected so as to have a mass that will result in the gyroscopic stabilization member having a sufficient angular momentum so as to gyroscopically stabilize the aircraft.

11 Claims, 17 Drawing Sheets

U.S. PATENT DOCUMENTS

| | | | |
|---|---|---|---|
| 4,232,996 A | 11/1980 | Stoffer | |
| 4,312,483 A | 1/1982 | Bostan | |
| 4,326,836 A | 4/1982 | Fitton | |
| 4,387,867 A | 6/1983 | Jordan | |
| 4,461,436 A * | 7/1984 | Messina | 244/23 C |
| 4,710,102 A | 12/1987 | Ortolano | |
| 4,767,270 A | 8/1988 | Seidel | |
| 4,773,618 A | 9/1988 | Ow | |
| 4,778,128 A | 10/1988 | Wright et al. | |
| 4,787,573 A | 11/1988 | Pauchard | |
| 4,930,984 A | 6/1990 | Kesel et al. | |
| 5,086,993 A * | 2/1992 | Wainfan | 244/48 |
| 5,096,382 A | 3/1992 | Gratzer | |
| 5,120,197 A | 6/1992 | Brooks et al. | |
| 5,152,478 A | 10/1992 | Cycon et al. | |
| 5,211,540 A | 5/1993 | Evans | |
| 5,259,571 A | 11/1993 | Blazquez | |
| 5,269,656 A | 12/1993 | Maga | |
| 5,295,643 A * | 3/1994 | Ebbert et al. | 244/7 B |
| 5,297,759 A | 3/1994 | Tilbor et al. | |
| 5,344,100 A * | 9/1994 | Jaikaran | 244/12.2 |
| 5,419,513 A | 5/1995 | Flemming, Jr. et al. | |
| 5,421,538 A | 6/1995 | Vassa | |
| 5,437,541 A | 8/1995 | Vainrub | |
| 5,498,136 A | 3/1996 | Namura et al. | |
| 5,507,453 A | 4/1996 | Shapery | |
| 5,653,404 A * | 8/1997 | Ploshkin | 244/12.2 |
| 5,727,754 A | 3/1998 | Carter, Jr. | |
| 5,829,956 A | 11/1998 | Chen et al. | |
| 5,860,620 A | 1/1999 | Wainfan et al. | |
| 5,860,788 A | 1/1999 | Sorensen | |
| 5,890,441 A | 4/1999 | Swinson et al. | |
| 5,961,289 A | 10/1999 | Lohmann | |
| 6,015,258 A | 1/2000 | Taylor | |
| 6,065,937 A | 5/2000 | Hunt | |
| 6,086,016 A | 7/2000 | Meek | |
| 6,102,661 A | 8/2000 | Robson et al. | |
| 6,241,474 B1 | 6/2001 | Alizadeh et al. | |
| 6,435,828 B1 | 8/2002 | Bostwick | |
| 6,604,706 B1 | 8/2003 | Bostan | |
| 2002/0011539 A1 | 1/2002 | Carter, Jr. | |

* cited by examiner

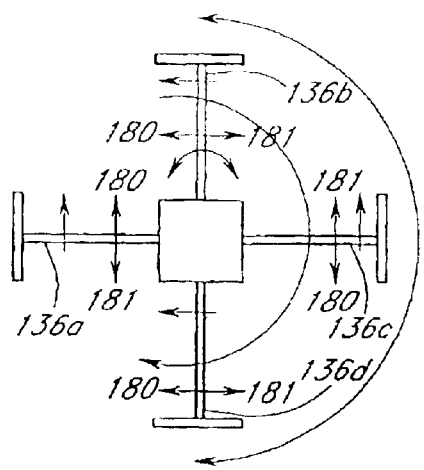
FIG.7A
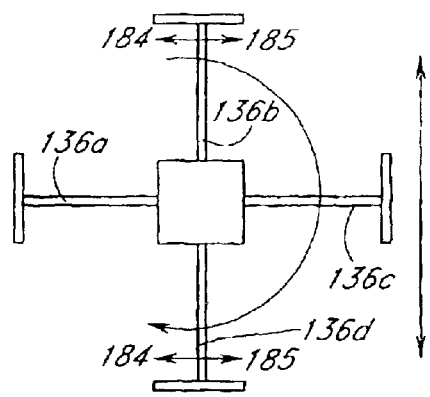
FIG.7B
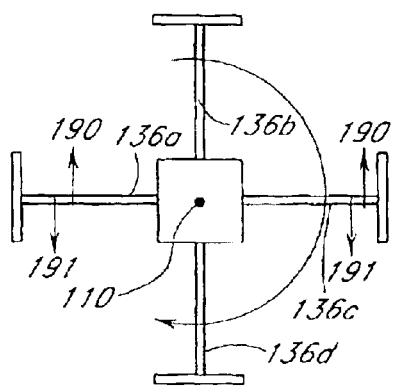
FIG.7C
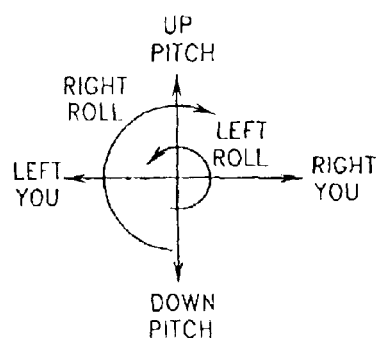

GYROSTABILIZED SELF PROPELLED AIRCRAFT

CROSS-REFERENCE TO RELATED APPLICATION(S)

This application is a continuation of U.S. Pat. Appl. 09/763,714, filed Feb. 22, 2001 now U.S. Pat. No. 6,604, 706, which claims the priority of U.S. Provisional Application 60/098,204, filed Aug. 27, 1998.

BACKGROUND OF THE INVENTION

The present invention relates to an aircraft and, in particular, concerns an unmanned vertical take-off or landing air vehicle that is gyroscopically stabilized during flights so as to enhance controllability of the flight operations of the vehicle.

DESCRIPTION OF THE RELATED ART

Unmanned air vehicles (UAV) are vehicles that provide tremendous utility in numerous applications. For example, UAV's are commonly used by the military so as to provide mobile aerial observation platforms that allow for observation of ground sites at reduced risk to military personnel. The typical UAV used in military applications, and also in other more civilian-type applications, is comprised of an aircraft that has the general configuration of fixed wing aircrafts known in the art. In particular, the typical UAV that is used today has a fuselage with wings extending outward therefrom, control surfaces mounted on the wings, a rudder and an engine that propels the UAV in generally forward flight. Typically, these UAV's are radio controlled such that an operator can control the flight of the UAV from a remote location. UAV's of the prior art can thus be used for obtaining photographic reconnaissance images without the risks to a pilot inherent in actually physically piloting the plane. While these UAV's of the prior art have considerable utility, there are still some shortcomings which limit the versatility of known prior art UAV's.

In particular, the typical UAV takes off and lands like an ordinary airplane. In particular, for take-off, the typical prior art UAV travels over a runway until sufficient airflow is created over the wings of the UAV such that the UAV takes off and begins to fly. Similarly, upon landing, the UAV is directed towards a runway and is then landed on the runway in the same manner as manned airplanes. However, in many circumstances, the use of runways for UAV's is impractical.

For example, for military applications, land-based runways are often unavailable adjacent the operational military zone or the available runways will be occupied by larger manned fixed-wing aircraft. Similarly, shipborne UAV's are even further restricted in available runway space due to the fact that most military ships are not equipped with sufficient deck space to constitute a runway for a UAV. To address this particular problem, UAV's are often forced to be launched with expensive catapult systems and then recaptured using expensive net systems which can result in damage to the UAV. While some types of military ships, such as aircraft carriers, may have the available deck space to operate UAV's, this available deck space is typically in full use by larger manned aircraft.

A further difficulty with airplane-type UAV's is that these vehicles are often insufficiently mobile to allow the UAV to operate effectively in confined airspace. In particular, it is often desirable to be able to move the UAV in a confined airspace, such as in an urban setting, at relatively low elevations. Airplane-type UAV's often travel too fast in order to operate effectively in these types of environments.

To address some of these problems, vertical take-off or landing (VTOL) UAV's have been developed in the prior art. For example, a helicopter-type UAV is one type of aircraft that can take off on limited available runway space and can maneuver in confined air spaces. While helicopter-type aircrafts solve some of the problems associated with fixed-wing UAV, the helicopter type UAV's also have some problems. In particular, helicopters are characterized by a relatively slow forward speed as the angle of attack of the rotor blade is limited. Moreover, helicopter-type UAV's often pose dangers to individuals upon landing due to the exposed propeller blade. This problem is accentuated in circumstances where the UAV is to be landed on confined moving surfaces, such as the surfaces of ships operating at sea.

Various other designs of VTOL UAV's have been developed, however, each of the existing designs suffer from stability problems in flight or relatively slow forward operational speeds. One example of a VTOL UAV is provided by U.S. Pat. No. 5,419,513 to Fleming, Jr., et al. The UAV disclosed in Fleming has a torroidal fuselage with a rotor assembly that provides thrust in a direction that is generally perpendicular to the plane of the torroidal fuselage. A pair of flight control surfaces are located on the outer perimeter of the fuselage so as to provide stability during forward flight. While the UAV disclosed in this patent is capable of vertical take-off and landing, this UAV is likely to be unstable in flight and is also likely to be limited in its speed of forward flight for the same reasons that a helicopter is also limited in its speed of forward flight. In particular, the propellers cannot be oriented such that the plane of rotation of the propellers is perpendicular to the direction of travel of the aircraft and, consequently, the forward speed of the aircraft is thus limited. Moreover, with these types of designs, it will be appreciated that stability during flight is also difficult to achieve as the flight envelope of this type of aircraft is relatively finite.

The stability of these types of aircraft has been addressed, somewhat imperfectly, through the use of gyroscopic stabilization members that provide rotational inertia to the aircraft to stabilize the aircraft during flight. One example of such an aircraft is provided by U.S. Pat. No. 4,461,436 to Messina. In Messina, a flying saucer shaped body is disclosed as having a propeller and a gyroscope is added into the body of the aircraft wherein the gyroscope is induced to rotate as a result of airflow from the propeller. While the aircraft disclosed in the Messina patent may provide somewhat greater gyroscopic stability, this particular aircraft does not contemplate transitioning from vertical flight, with the plane of the propeller substantially parallel to the plane of the earth, to substantially horizontal flight where the plane of the propeller is substantially perpendicular to the plane of the earth. This transition is generally thought to have significant stability difficulties that are unlikely to be overcome by the addition of the airpowered gyroscope.

Yet another example of a VTOL aircraft that has some degree of gyroscopic stabilization is provided in U.S. Pat. No. 5,890,441. This particular patent discloses a very complex aircraft having multiple vertically directed and horizontally directed propellers to provide a combination of horizontal and vertical thrust to operate the aircraft. It is believed that the counter-rotation of these propellers is likely to limit the gyroscopic stabilization effect provided by the propellers thus leaving the aircraft more unstable in flight.

Moreover, the use of multiple rotating propellers adds to both the cost and the complexity of the aircraft.

From the foregoing, it will be apparent that there is a need for a UAV aircraft that is capable of vertical take-off or landing that is both inexpensive and stable in flight. Moreover, there is a need for a VTOL UAV that is capable of travelling not only in a slow hover mode but is stable enough to transition to substantially full horizontal flight for fast movement.

SUMMARY OF THE INVENTION

The aforementioned needs are satisfied by the unmanned air vehicle of the present invention which is comprised of a fuselage that defines aerodynamic flight surfaces, an engine mounted to the fuselage having an engine shaft arranged to rotate about a longitudinal axis with respect to the fuselage, and a propeller mounted to the engine shaft so as to rotate to thereby provide thrust so as to cause the UAV to travel through the air. The aircraft also comprises a gyroscopic stabilization member coupled to the shaft such that rotation of the engine shaft results in rotation of the gyroscopic member wherein the gyroscopic member is selected so as to have an angular momentum that is at least approximately 30 times larger than the moment of inertia el the aircraft so that the aircraft is gyroscopically stabilized throughout the entire flight envelope.

In one aspect, the aircraft includes a flight control system that is adapted to control the flight of the aircraft during the entire flight envelope. The control system is adapted to permit vertical take-off or landing of the vehicle with the plane of the propeller being substantially parallel to the plane of the ground through a transition to horizontal flight wherein the plane of the propeller is substantially perpendicular to the plane of the ground and wherein gyroscopic stabilization is provided during such transition.

The use of a gyroscopic stabilization member for such an aircraft means that the aircraft will be more stable during the entire flight envelope as the effects of external and internal moments, such as changes in moments due to fuel consumption or wind gust, result in gyroscopic precession of the vehicle. As a result of the gyroscopic precession, the changes in direction of flight of the vehicle as a result of such internal or external moments occur 90 degrees in the direction of rotation from the point where the resulting moment is applied. Preferably, the angular momentum of the gyroscopic member is large enough such that possible variations of the vehicle orientation due to wind gust will be rapidly suppressed without affecting the air vehicle's position in space.

In one particular environment, the gyroscopic member that rotates as a result of rotation of the engine shaft is comprised of a weighted disc that is coupled to the drive shaft via a gear assembly such that the disc can be rotated at an angular velocity selected to provided the gyroscopic stabilization for the air vehicle. In another embodiment, the gyroscopic stabilization member is comprised of a ring that is attached to the outer ends of the blades of the propeller and the ring is also selected so as to have a mass that will result in the gyroscopic stabilization member having a sufficient angular momentum so as to gyroscopically stabilize the aircraft. In yet another embodiment, the propeller itself is formed to have sufficient weight relative to the other components of the air vehicle such that the propeller gyroscopically stabilizes the vehicle.

In one particular aspect of the invention, the fuselage defines an opening extending therethrough, and a propeller and engine are mounted within the opening so as to provide a ducted fan configuration for the air vehicle. The gyroscopic stabilization member is mounted on the engine shaft so as to also be positioned within the opening defined by the fuselage. The flight control system includes a plurality of movable flight control surfaces that can be independently moved so as to provide directional control about a pitch, yaw and roll axes. In all orientation of flight, the gyroscopic stabilization member provides gyroscopic stabilization about the pitch and yaw axes of the vehicle. The flight control system is adapted to allow the ducted fan fuselage to take-off and land in a manner where the plane of rotation of the propeller is substantially parallel to the landing surface.

The ducted fan aircraft is further configured such that, following vertical take-off, the plane of the propeller can be oriented so as to be approximately 5–10 degrees off-set from the plane of the earth so as to propel the vehicle in a direction parallel to the plane of the earth at a relatively low speed in a well-known manner. The flight control system is further configured so as to cause the ducted fan air vehicle to orient itself such that the plane of the propeller is substantially perpendicular to the plane of the earth to allow for more rapid horizontal flight. During each of the three general zones of the flight envelope of the air vehicle, the gyroscopic stabilization member provides gyroscopic stabilization about a pitch axis and a yaw axis which are perpendicular to each other and also perpendicular to a roll axis which, in one embodiment, comprises the longitudinal axis of the air vehicle and is coincident with the axis of rotation of the propeller.

The air vehicle of the present invention is more stable in operation due to the addition of the gyroscopic stabilization member. Further, directly linking the gyroscopic stabilization member to the drive shaft of a single propeller results in a stable, yet inexpensive, aircraft that is capable of both vertical and horizontal flight. The use of a ducted fan-type design in one embodiment of the invention provides a vehicle that is suitable for take-off and landing on confined surfaces without posing undo risk to operating personnel standing nearby. These and other objects and advantages of the present invention will become more fully apparent from the following description taken in conjunction with the accompanying drawings.

BRIEF DESCRIPTION OF THE DRAWINGS

FIGS. 7A through 7C are schematic illustrations illustrating the positioning of the control surfaces of the UAV's of the illustrated embodiments during various flight operations.

DETAILED DESCRIPTION OF THE PREFERRED EMBODIMENTS

Figure 1:
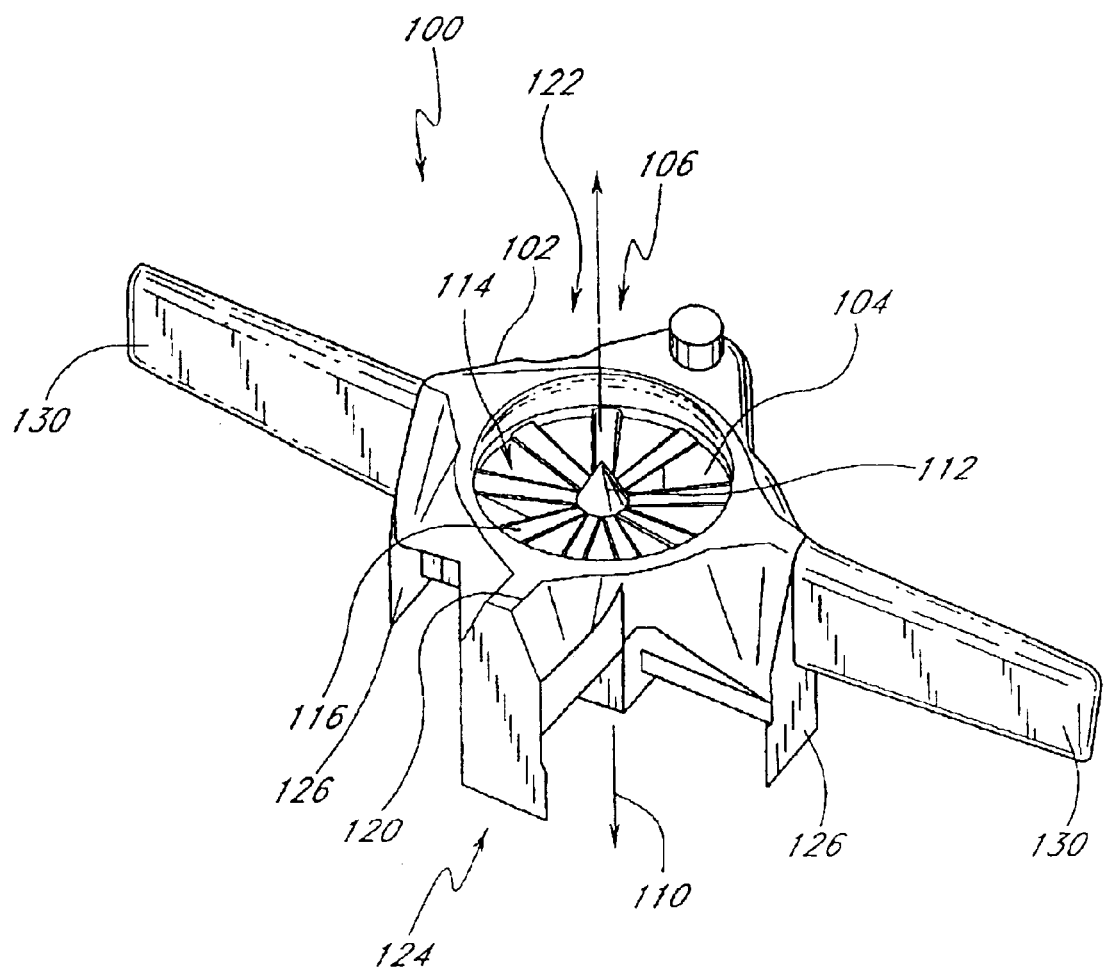
FIG. 1 is a perspective view generally illustrating one embodiment of an unmanned air vehicle (UAV) of the present invention.

Reference will now be made to the drawings wherein like numerals refer to like parts throughout. FIG. 1 illustrates an unmanned air vehicle (UAV) 100 that is adapted to be gyroscopically stabilized in a manner that will be described in greater detail below. The UAV 100 in this embodiment has a ducted fan configuration such that a fuselage 102 defines an opening 104 in which a propulsion mechanism 106 is mounted. In this embodiment, the fuselage 102 is generally circular and is generally symmetrical about an axis 110 that extends longitudinally through the opening 104 so as to be coincident with a prop shaft 112 about which a propeller 114 is mounted. As the propeller 114 of the propulsion mechanism 106 is mounted within the opening 104 of the fuselage 102, a configuration of the UAV 100 is generally referred to as a ducted fan configuration as the propeller 114 is mounted within a duct defined by the opening 104. In this embodiment, the propeller 114 incorporates a plurality of blades 116 that are preferably variable pitch blades such that the pitch of the blades can be changed to alter the propulsion force provided by the propeller 114. As illustrated in FIG. 1, the forward edge 120 of the fuselage 102 is generally rounded so as to permit airflow into the opening 104 and also over the outer lateral surfaces 122 of the fuselage 102.

As is also illustrated in FIG. 1, a rear edge 124 of the fuselage 102 is adapted to have a plurality of landing struts 126 so as to enable the UAV 100 to land and take-off in a vertical take-off or landing (VTOL) profile. In particular, the four landing struts 126 allow the UAV 100 to take-off from a surface with the plane of the propeller 114 being substantially parallel to the plane of the ground and further allowing the UAV to land in a similar manner.

As is also illustrated in FIG. 1, the UAV 100 can also be equipped with optional wings 130 that can either be fixably mounted to the outer lateral surfaces 122 and the fuselage 102 or can be pivotally mounted in a manner known in the art. The wings 130 are optional in that they provide additional flight surfaces to facilitate horizontal flight of the UAV 100 wherein the plane of the propeller 114 will be substantially perpendicular to the plane of the ground. It will, however, be appreciated by persons of ordinary skill in the art, by the following description that the inner surfaces of the opening 104 can provide sufficient flight surfaces to allow for horizontal flight of the UAV 100 and that the wings 130 are thus optional to provide better flight characteristics.

As will be described below, the UAV 100 can have a number of different configurations which are illustrated in three separate embodiments. Moreover, each of the embodiments of the UAV includes a gyroscopic stabilization member which gyroscopically stabilizes the UAV during its entire flight envelope. The configurations of each of the following illustrated embodiments of the UAV are very similar except that the manner in which such gyroscopic stabilization is provided differs. The use of a gyroscopic stabilization member in the embodiments of the UAV results in a more stable UAV which, in the particular application of a ducted fan UAV, is essential for permitting stable flight characteristics of the UAV. Due to the similarity between each of the following embodiments, the reference numerals for similar components will be similar, with the reference numeral series 200, 300 and 400 being reserved for the three following embodiments. However, it will be appreciated that the reference numeral series 100 will be used to generically refer to the components common to each of the embodiments of the UAV of the present invention.

Figure 2B:
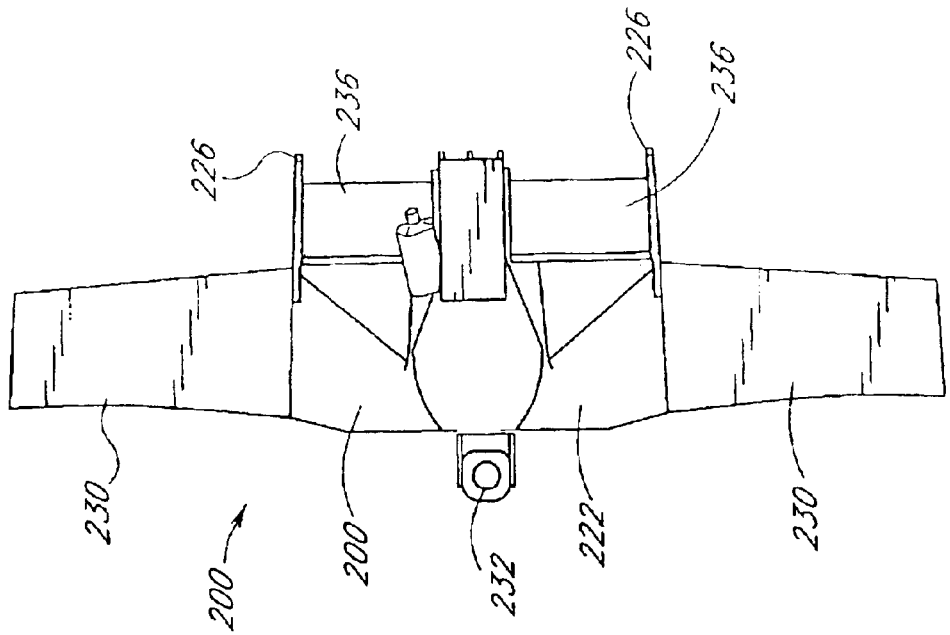
FIGS. 2A through 2E are side, bottom, front, rear and cross-section views of a first embodiment of a unmanned air vehicle of the present invention.
Figure 2A:
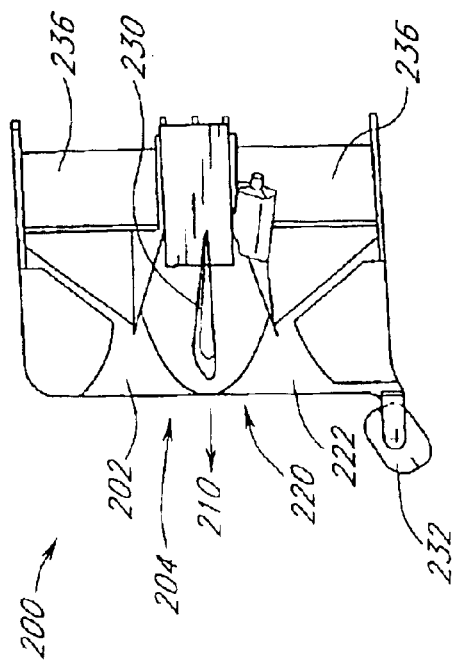

Referring now to FIGS. 2A through 2E, a first embodiment of a UAV 200 having a ring shaped gyroscopic stabilization member will now be described. In particular, FIGS. 2A through 2O illustrate that the UAV 200 includes a fuselage 202 having an opening 204 extending through the fuselage 202. A propulsion mechanism 206 is positioned within the opening 204. The opening 204 extends essentially through the length of the fuselage 202 such that the fuselage 202 is centered about an axis 210. An engine 215 with a fuel system is mounted within the opening 204 and has a prop shaft 212 that is coincident with the axis 210. A propeller 214 having four to nine variable pitch blades 216 are mounted on the prop shaft 212 so that the propeller is recessed within the opening 204.

Figure 2C:
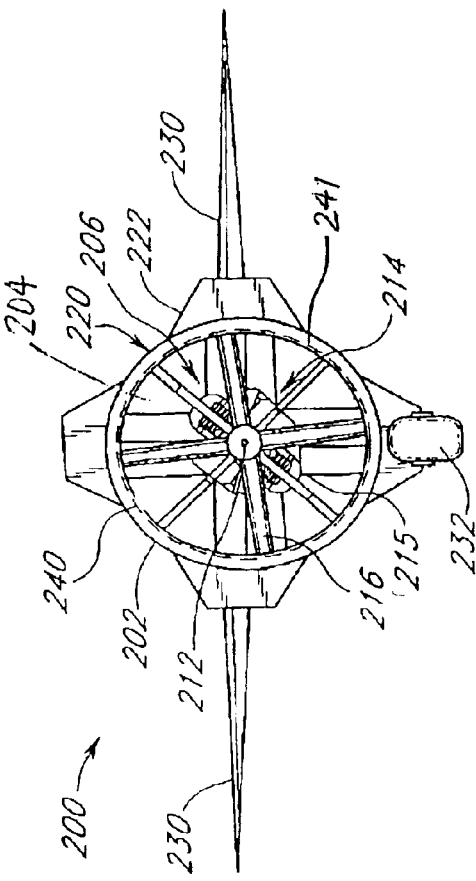

As is illustrated in FIGS. 2A through 2C, the forward edge 220 of the fuselage 202 is generally rounded for aerodynamic performance as are the outer lateral surfaces 222 of the fuselage 202. In this embodiment two wings 230 are mounted to the outer lateral surfaces of 222 of the fuselage 202 so as to provide greater flight surfaces for the UAV 200. The UAV 200 is specifically configured as a reconnaissance vehicle for use in aerial reconnaissance such as the type of reconnaissance conducted during military operations. As a consequence, a rotatable gimbaled camera 232 is mounted to the outer lateral surfaces 222 of the fuselage 202 in the manner shown in FIGS. 2A through 2C. The camera 232 will be one of a number of well-known reconnaissance cameras that will be controllable by a remote operator by an RF communications with a control system of the UAV 200 in a manner that is generally known in the art.

Figure 2D:
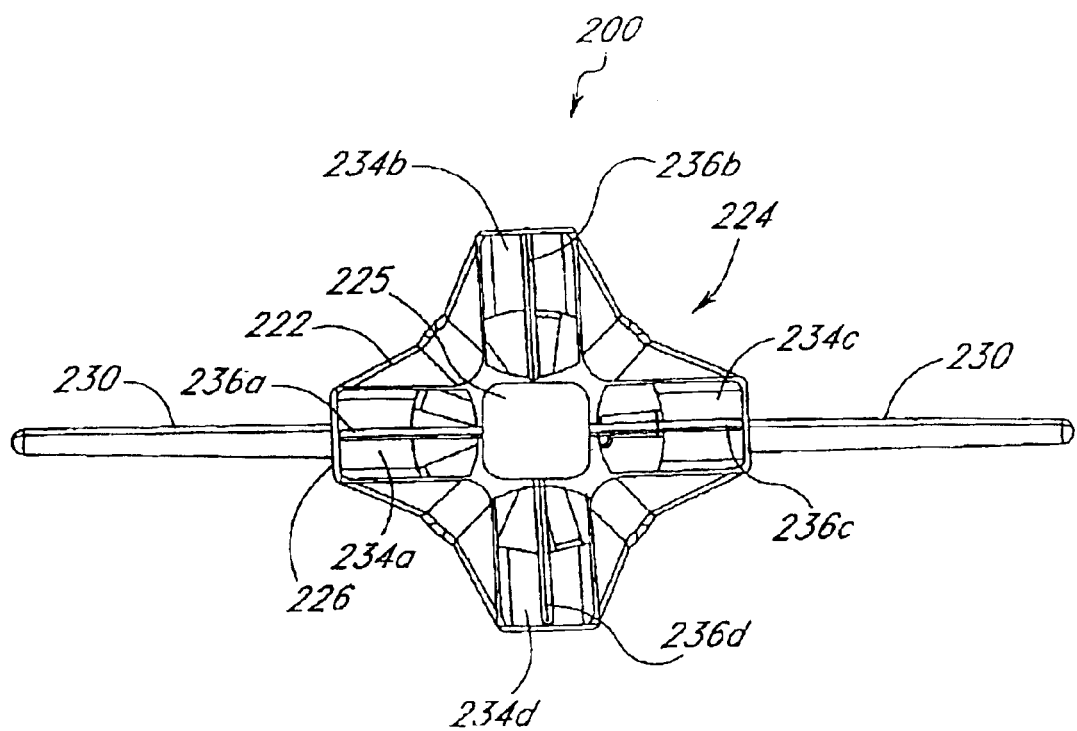
Figure 2E:
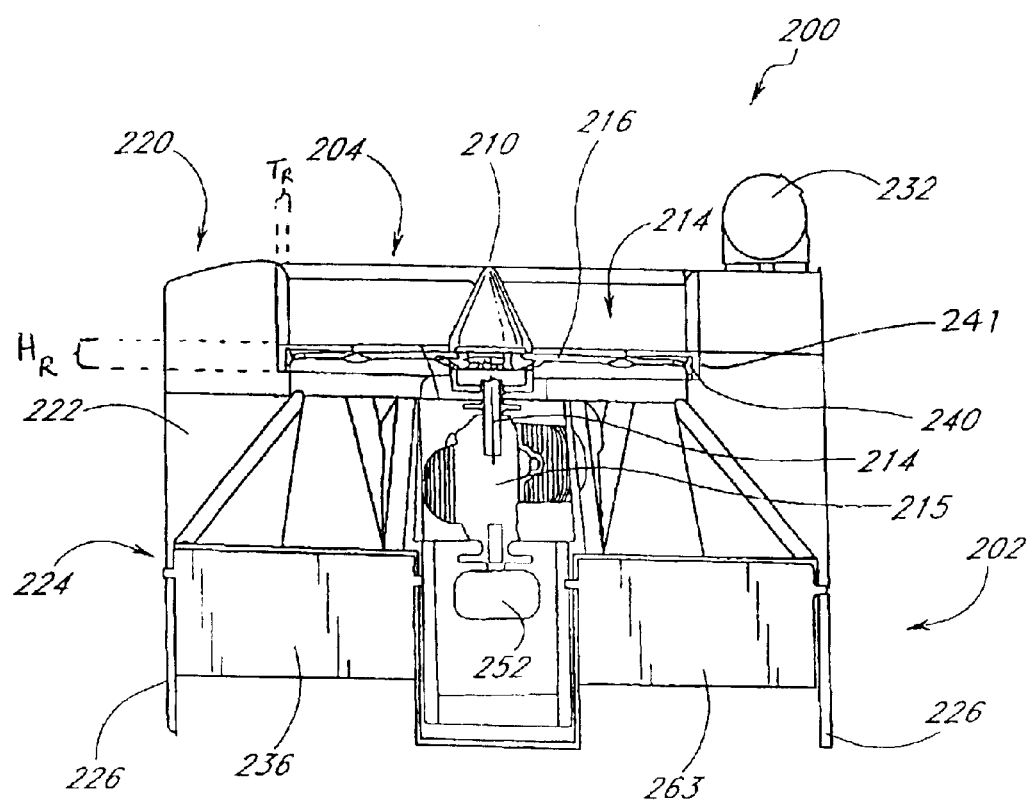

As is illustrated in FIG. 2D, the rear 224 of the fuselage 202 is formed to define a plurality of output ports 234a–234d from the opening 204 (FIG. 2E). As the propeller 214 is mounted forward of the output ports 234, the propeller 214 induces air flow through the output ports 234a–234d. Preferably, there are four control surfaces 236a–236d that are pivotally mounted so as to be centered within the outlet ports 234a–234d, respectively. The control surfaces 236a through 236d are independently pivotable within the output ports 234a–234d and are controlled by a flight control system (see FIG. 6) such that by pivoting the control surfaces 236a–236d the flight operation of the UAV 200 can be controlled about the pitch, yaw and roll axes in a manner that is known in the art. The operation of the control surfaces 236 will be described in greater detail below in reference to FIGS. 7A–7C.

As discussed above, each of the embodiments of the UAV incorporates a gyroscopic stabilization member that provides gyroscopic stabilization to the UAV. In the embodiment of the UAV 200, a gyroscopic stabilization device 240 is comprised of a ring that is attached to the outer edges of each of the propeller blades 216. The ring 240 is preferably sized and weighted such that the rotation of the propeller 214 will result in the ring 240 having a sufficient angular momentum relative to the moment of inertia of the aircraft such that the aircraft 200 is gyroscopically stabilized while in flight. The ring 240 is situated in a recess formation or groove 241 (see FIGS. 2C and 2E) that is configured in the fuselage 202 and extends circumferentially about the opening 204. The depth $T_R$ and height $H_R$ of the recess 241 (defining a cross section thereof) are dependent on the size and/or shape of the ring 240 (or its cross-section) in that the recess 241 houses the ring 240 in a manner whereby interference with or impedance of the air flow passing through the opening 204 to the output ports 234a–234d is minimized, if not avoided. The ring 240 may be situated within the recess 241 such that no portion thereof extends into the opening 204 (FIG. 2E) or is substantially visible within the opening 204 when viewed from the front of the UAV 200 (FIG. 2C).

As it will be described in greater detail below, the gyroscopic stabilization member 240 gyroscopically stabilizes the aircraft 200 such that any external or internal force on the aircraft 200 results in the aircraft experiencing gyroscopic precession motion. The gyroscopic precession is manifested ahead 90 degrees in the direction of rotation of the gyroscopic member 240. In other words, the UAV 200 is stabilized by the ring 240 such that when an external torque that is perpendicular to the axis of rotation acts upon the UAV 200, this results in a change in the angular momentum of the UAV. Due to the gyroscopic stabilization ring 240 having a large angular momentum as compared to the moment of inertia of the UAV 200, the external torque is manifested as a change in the direction of the angular momentum of the ring 240. This results in the axis about which the ring 240 is rotating (in this case the axis 210), processing or changing its orientation.

It will be appreciated that the angular momentum of the gyroscopic member 240 is both a component of the weight of the ring 240 and also the rate at which it is rotated by the propeller shaft 212. As will be described in greater detail below, the angular momentum of the ring 240 must be significantly greater than the moment of inertia of the rest of the aircraft 200 about the axis of the rotating ring so that the aircraft 200 is gyroscopically stabilized. In one particular implementation, a two pound rotating ring 240 is used in an aircraft 200 having the basic configuration of the aircraft illustrated in FIGS. 2A through 2E wherein the ring is rotated at an angular velocity of approximately 7500 rpm which results in a gyroscopically stabilized vehicle 200 for a vehicle having the weight distribution of the various components as listed in Table 2-1 reproduced below:

TABLE 2-1

AV Weight Distribution

| | ITEM | W (lb.) | X | Y | Z | Mx | My | Mz |
|---|---|---|---|---|---|---|---|---|
| 1 | Engine, Brackets, Servomech. | 17.20 | −4.70 | 0.00 | 0.00 | (80.84) | — | — |
| 2 | Ignition | 1.25 | 5.00 | 0.00 | −15.00 | 6.25 | — | (18.75) |
| 3 | Electrical Generator | 6.25 | −10.00 | 0.00 | 0.00 | (62.50) | — | — |
| 4 | Fuel Pump, Drain Valve | 1.00 | −9.00 | 0.00 | −17.50 | (9.00) | — | (17.50) |
| 5 | Flow Transmitters (Two) | 1.00 | −3.50 | 0.00 | −15.00 | (3.50) | — | (15.00) |
| 6 | Tuned Exhaust Pipe | 1.00 | −4.00 | −4.00 | −4.00 | (4.00) | (4.00) | (4.00) |
| 7 | Var. Pitch Propeller | 6.50 | 0.00 | 0.00 | 0.00 | — | — | — |
| 8 | Rotating Ring | 2.00 | 0.00 | 0.00 | 0.00 | — | — | — |
| 9 | Integrated Avionics Computer (IAC) | 8.00 | 4.00 | 0.00 | 16.00 | 32.00 | — | 128.00 |
| 10 | Data Link | 7.50 | 4.13 | 0.00 | 19.00 | 30.94 | — | 142.50 |
| 11 | OMNI Antenna Hover Mode | 0.25 | −11.00 | 0.00 | 0.00 | (2.75) | — | — |
| 12 | OMNI Antenna Fwd. Flt. Mode | 0.25 | −6.00 | 0.00 | −22.00 | (1.50) | — | (5.50) |
| 13 | GPS Antenna | 0.50 | 6.00 | 0.00 | 14.00 | 3.00 | — | 7.00 |
| 14 | Servomechanisms (4) | 3.00 | −15.00 | 0.00 | 0.00 | (45.00) | — | — |
| 15 | Electrical Battery | 2.50 | 4.00 | 1.50 | 15.00 | 10.00 | 3.75 | 37.50 |
| 16 | Sensor Payload | 12.00 | 12.00 | 0.00 | −17.00 | 144.00 | — | (204.00) |
| 17 | Fuselage Structure | 20.00 | −2.00 | 0.00 | 0.00 | (40.00) | — | — |
| 18 | Landing Gear (Four Leggs) | 2.00 | −16.00 | 0.00 | 0.00 | (32.00) | — | — |
| 19 | Control Surfaces | 2.00 | −15.00 | 0.00 | 0.00 | (30.00) | — | — |
| 20 | Left Wing Section | 3.00 | 0.00 | −35.00 | 0.00 | — | (105.00) | — |
| 21 | Right Wing Section | 3.00 | 0.00 | 35.00 | 0.00 | — | 105.00 | — |

TABLE 2-1-continued

AV Weight Distribution

| ITEM | W (lb.) | X | Y | Z | Mx | My | Mz |
|---|---|---|---|---|---|---|---|
| 22 Left Fuel Cell | 25.00 | 2.00 | −16.50 | 0.00 | 50.00 | (412.50) | — |
| 23 Right Fuel Cell | 25.00 | 2.00 | 16.50 | 0.00 | 50.00 | 412.50 | — |
| 24 Common Fuel Cell | 3.00 | −5.00 | 0.00 | −16.50 | (15.00) | — | (49.50) |
|  | 153.20 | 0.00 | (0.00) | 0.00 | 0.10 | −0.25 | 0.75 |

As is further illustrated by the embodiment of FIGS. 2A through 2E, the motor 215 is mounted within the fuselage 202 such that the propeller shaft 212 is substantially coincident with the longitudinal axis 210 of the opening 204 of the fuselage 202. As will also be apparent from FIG. 2E and the above table, the weight of the components comprising the aircraft 200 are preferably positioned such that the center of gravity and the aerodynamic center of the aircraft are substantially coincident with the center of rotation of the ring such that the stability of the aircraft is enhanced.

The motor in this embodiment is comprised of a Herbrandson DYAD-engine manufactured by Herbrandson Engines, Inc. of Lawndale, Calif. As is also shown in FIG. 2E, an electrical generator 252 is attached to the shaft 212 of the motor 215 such that the electrical generator 252 can produce electrical power for the electrical systems of the aircraft 200. As discussed above, the propellers 214 in this embodiment are preferably variable pitched propellers and a variable pitch mechanism 254 of a type known in the art is used to control the pitch of the propellers so as to control the thrust produced by the aircraft and, consequently, the speed of operation of the aircraft 200. Various other systems are included in the aircraft 200 such as the systems listed in the above table in a well-known manner.

Figure 3A:
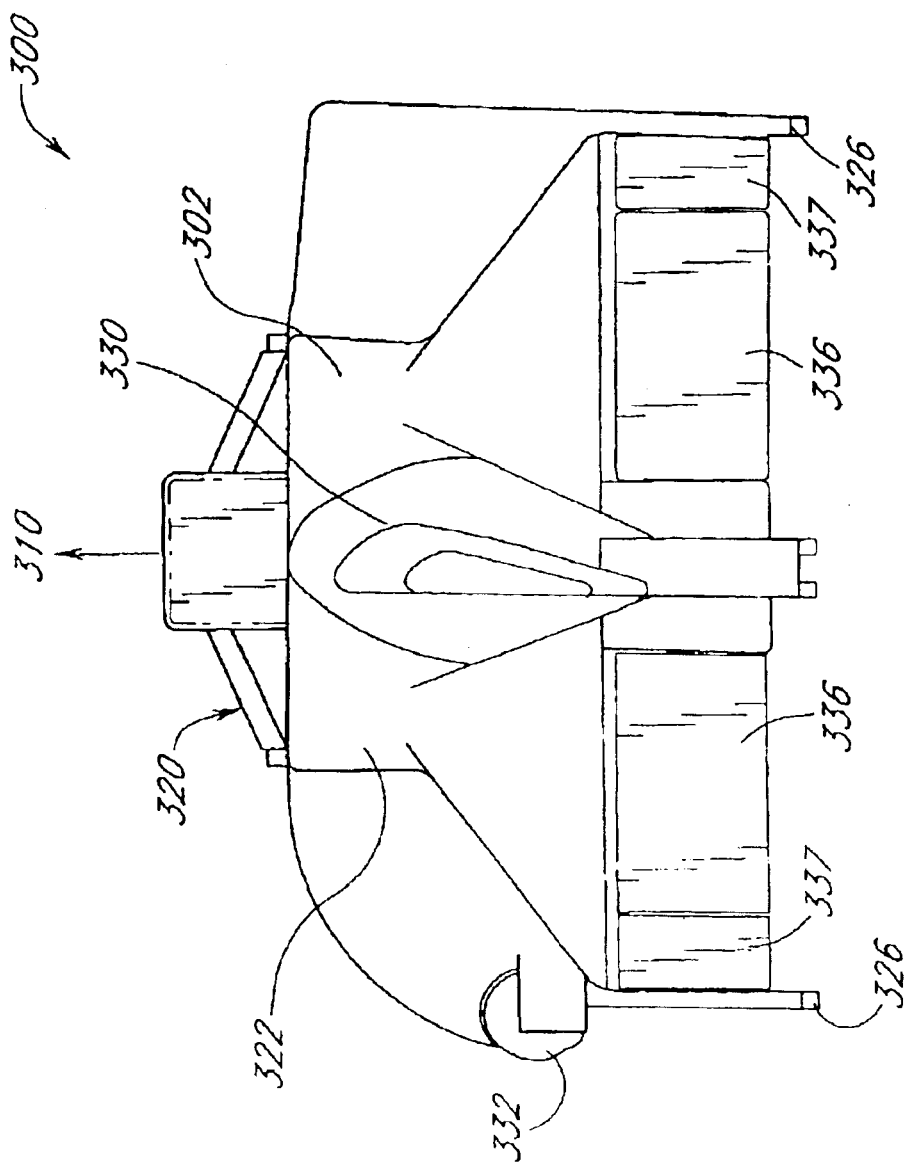
FIGS. 3A through 3E are side, bottom, front, rear and cross-section views of a second embodiment of a UAV of the present invention.
Figure 3B:
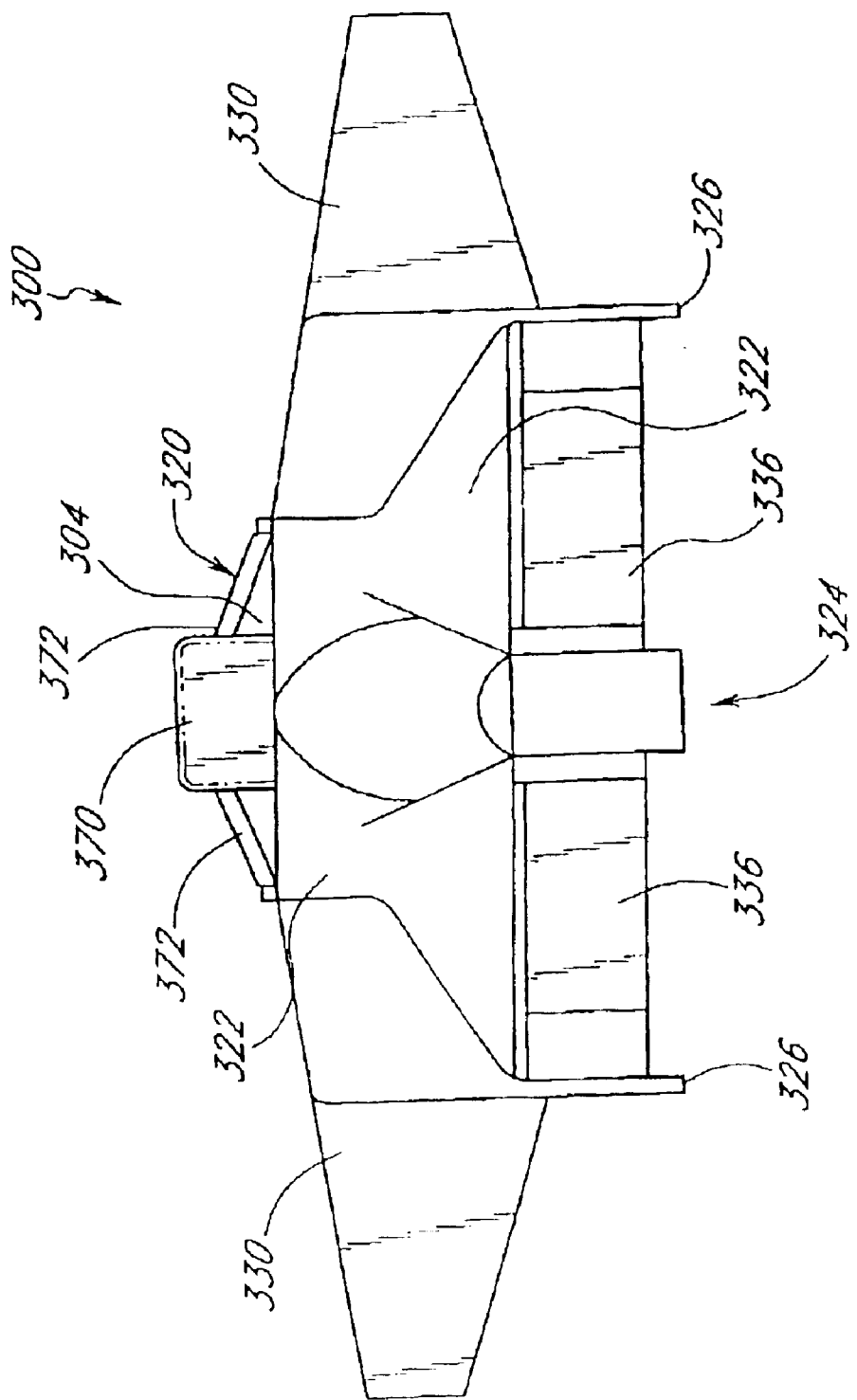

The embodiment of FIGS. 2A through 2E is but one embodiment of a UAV that is gyroscopically stabilized through the use of a gyroscopic stabilization member that is powered by the propeller shaft of the aircraft. FIGS. 3A through 3E illustrate yet another embodiment of a gyroscopically stabilized UAV similar to the embodiments illustrated in FIGS. 2A through 2E. In particular, FIGS. 3A through 3E illustrate another embodiment of a UAV 300 that also has a ducted fan fuselage 302 defining an opening 304 in which a propulsion mechanism 306 is positioned. The opening 304 further defines an axis 310 that extends therethrough such that the fuselage 302 is symmetrical about the axis 310. A motor 350 is mounted within the opening 304 in a well-known manner and has a propeller shaft 312 that is substantially coincident with the axis 310. A propeller 314 (FIG. 3C) is mounted on the propeller shaft 312 with a plurality of propeller blades 316 extending laterally outward from the propeller shaft 312. As discussed above, the blades 316 are also preferably variable pitch blades and there is a variable pitch mechanism 354 which controls the pitch of the propeller blades in a well-known manner. As is also illustrated in FIG. 3A, the forward edge 320 of the fuselage is preferably countered so as to provide smooth air flow over the outer lateral surfaces 322 of the fuselage 302. Optionally, wings 330 (see FIG. 3B) are attached to the outer lateral surface 322 of the fuselage 302 in the same manner as described above. Towards the rear edge 324 of the fuselage 302, a plurality of landing struts 326 are attached to the fuselage and a plurality of pivoting control surfaces 336 are also mounted so as to be positioned within the outlet ports 334a–334d of the opening 304. In this manner, manipulation of the control surfaces 336a–336d in the openings 334 will result in flight control of the vehicle 300 in a manner that will be described in greater detail below.

The embodiment of the UAV 300 also includes an additional engine cooling fan system 370 which cools the engine during operation in a manner known in the art. The cooling fan system 370 is mounted to the forward edge 320 of the fuselage 302 on struts 372 so as to be positioned adjacent the opening 304.

Figure 3D:
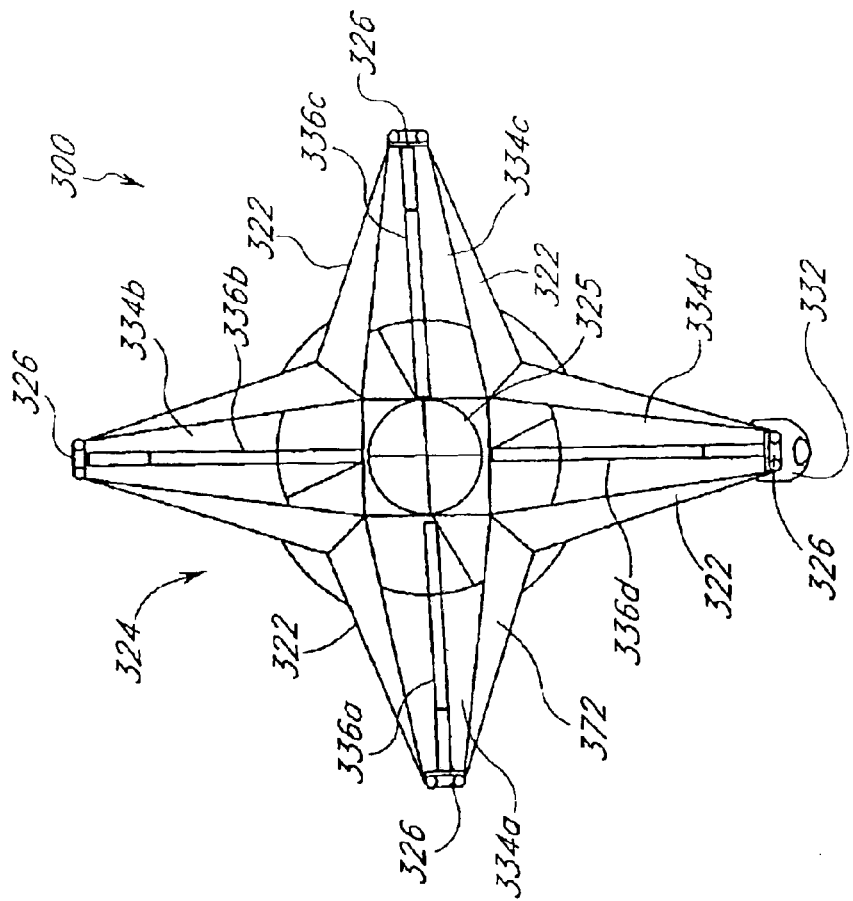
Figure 3C:
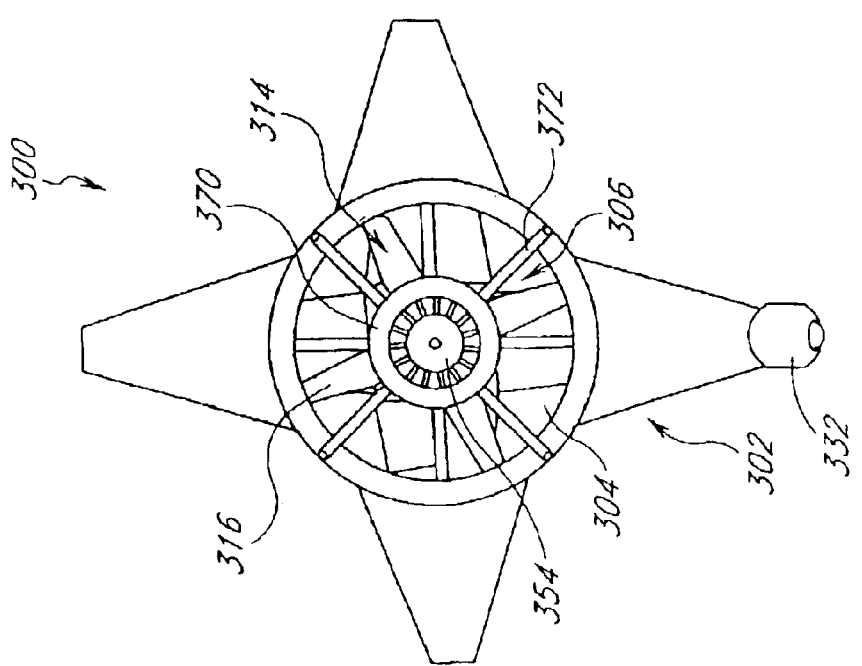
Figure 3E:
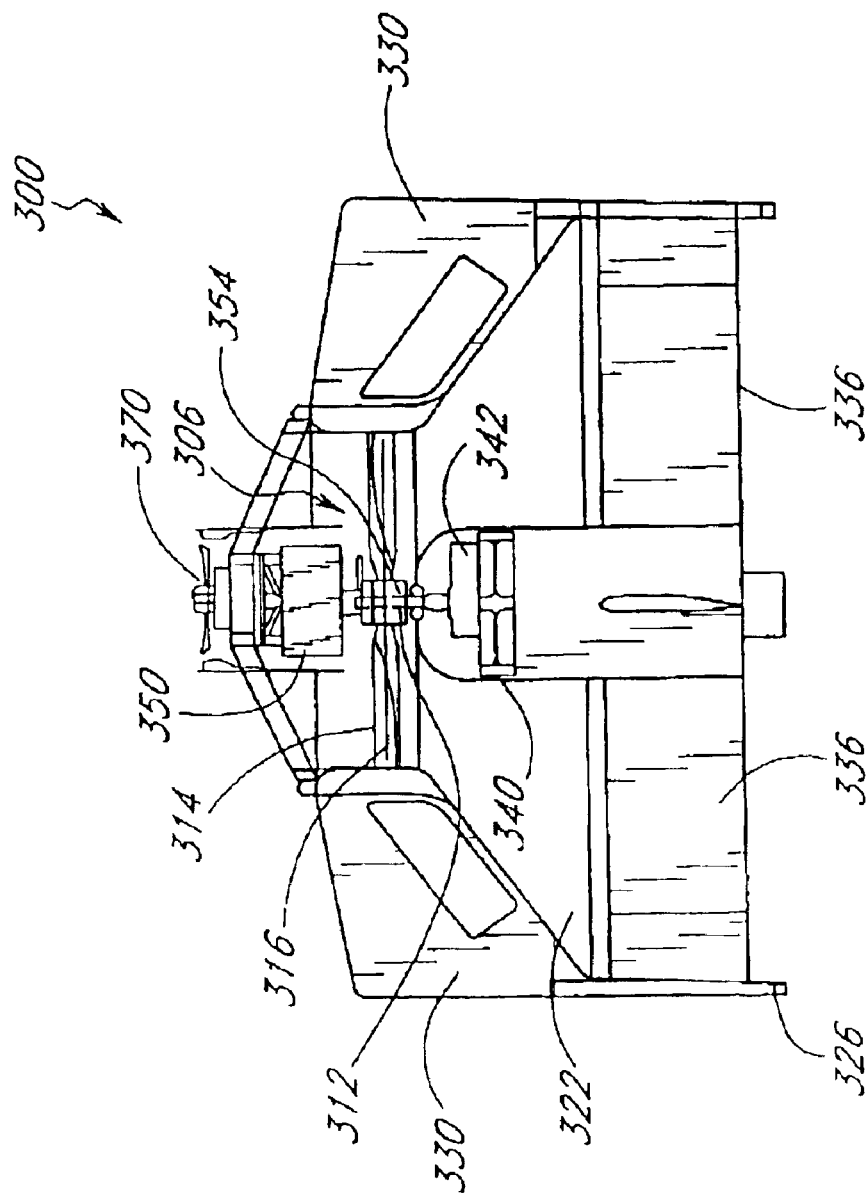

As is also shown in FIG. 3E, the gyroscopic stabilization device 340 in this embodiment is comprised of a weighted disc that is attached to the propeller shaft 312 via a gear mechanism 342. The gear mechanism is designed to rotate the disc at a speed faster than the rotation of the propeller shaft 312 such that a desired angular momentum of the disc can be achieved. Again, the angular momentum of the gyroscopic stabilization disc is dependent upon its angular velocity and also the weight of the disc and the weight distribution of the disc and this angular momentum should be selected so as to be substantially larger than the moment of inertia of the rest of the aircraft 300 about the axis of rotation in order to gyroscopically stabilize the aircraft 300. Preferably, the weight distribution of the disc 340 is selected so that the weight is concentrated at the outer perimeter so as to increase the angular momentum of the disc. In one embodiment, the applicant has built a 180 pound air vehicle which has a 38 horsepower motor such as a model AR741 UAV engine limited motor available from UAV Engines, Ltd. of England. The gear mechanism 342 is adapted to rotate the disc 340 at a high rpm, on the order of 21,000 rpm. The disc 340 in this particular embodiment has a weight of approximately 13 pounds, has a diameter of 10.8 inches and is comprised of a machined steel plate that is attached to the propeller shaft 312 via a built transmission system in a well-known manner. To impart the 21,000 rpms to the disc 340 requires approximately 3 horsepower of the 38 horsepower motor. By rotating the disc at this angular velocity, the angular momentum of the disc 340 can be sufficiently high so as to gyroscopically stabilize the aircraft in the manner that will be described in greater detail below.

Both the embodiments of the aircraft 200 and the aircraft 300 incorporate the use of a member that is attached to a rotating propeller shaft so as to generate sufficient angular momentum such that the aircraft is gyroscopically stabilized so that when external or internal moments are applied to the aircraft, the resulting force of the moments is translated into gyroscopic precession. Both the embodiments of the vehicle 200 and the vehicle 300 are relatively large vehicles, e.g. on the order of 150–180 pounds with dimensions of approximately 3–4 feet in length and 3–4 feet in width. It will be appreciated, however, that larger aircraft with increased motor size and increased performance will require larger gyroscopic stabilization members or gyroscopic stabilization members that are rotated at higher angular velocities in order to gyroscopically stabilize the aircraft. Similarly, smaller and more lightweight aircraft require smaller and more lightweight gyroscopic stabilization members.

In fact, the embodiment of a UAV 400 illustrated in FIGS. 4A through 4E illustrate a lightweight UAV 400 that is gyroscopically stabilized through the use of a heavier propeller. In particular, referring to FIGS. 4A through 4E, an ultra lightweight version of a UAV weighing approximately 7½ pounds is illustrated. The basic configuration of the UAV is similar to the configurations of the UAV 200 and the UAV 300 described above in connection with FIGS. 2A through 2E and 3A through 3E respectively. The ultra lightweight UAV 400 incorporates a fuselage 402 having an opening 404 in which a propulsion mechanism 406 is mounted. The fuselage 402 is symmetrical about an axis 410 that is coincident with a propeller shaft 412 that rotates a propeller 414 having a plurality of variable pitch blades 416. A motor 450 is mounted within the opening 404 of the fuselage and the motor, in this embodiment, is a well-known internal combustion engine rotating at speeds of up to 21,000–22,000, rpm. The forward edge of 420 of the fuselage 402 is countered so as to allow for air flow over the lateral surfaces 422 of the fuselage 402. The rear edge 424 of the fuselage 402 as illustrated in FIG. 40, includes four landing struts 426 and four control surfaces 436a–436d that are mounted so as to be positioned adjacent outlet openings 434a–434d in the fuselage 402 such that airflow from the propellers travels through the opening 404 and exits out of the outlet ports 434 over the control surfaces 436. As will be described in greater detail below, by moving the control surfaces 436 the movement of the vehicle 400 about the pitch, roll and yaw axes can be controlled. Moreover, the control surfaces 436 may also include an auxiliary control surface 437 that is specifically adapted to stabilize about the roll axis, i.e., the axis 410. The main control surfaces 436 can then be used to control the flight of the aircraft 400 about the pitch and yaw axes in the manner that will be described in greater detail below in connection with FIGS. 7A–7C.

This particular embodiment of a UAV is particularly small and lightweight in size. In particular, the UAV is adapted to be 6 inches in height, and have a diameter of approximately 5 to 6 inches. This particular vehicle fully loaded will weigh approximately 7½ pounds. Due to the particularly light weight, the propeller 414 can be configured to be made out of a heavy material such as steel such that the angular momentum of the propeller relative to the moment of inertia of the rest of the aircraft about the axis of rotation of the aircraft 400 is sufficient such that the aircraft is gyroscopically stabilized. In one embodiment, a steel propeller having five blades is used.

Hence, the use of a gyroscopic stabilization member can either be a member that is attached to the propeller shaft 412 that is separate from the propeller 414 or, if the aircraft 400 is small enough, can be comprised of a propeller 414 that is specifically configured to provide both propulsion power and also have sufficient angular momentum so as to provide gyroscopic stabilization to the aircraft. To gyroscopically stabilize the aircraft, the Applicant has determined that the ratio between the angular momentum of the gyroscopic member and the moment of inertia of the aircraft is at least approximately 30.

Each of the embodiments of the UAV 200, 300 and 400 are different embodiments of a gyroscopic stabilized UAV. By gyroscopically stabilizing the UAV, internal and external moments exerted upon the aircraft during flight results in precession of the aircraft. Moreover, the gyroscopic stabilization of the aircraft results in a slower rate of change in the orientation of the aircraft in response to changes in internal and external moments, such as changing fuel consumption, change in propeller pitch, wind and other disruptive forces. This decrease in the rate of change of the orientation of the aircraft simplifies the control of the aircraft.

In particular, it will be appreciated that the gyroscopic member enables the attitude or orientation of the aircraft to be changed in a predictable manner. In particular, since the angular momentum of the gyroscopic member is relatively large when compared with the rotational inertia of the aircraft along an axis perpendicular to the rotational axis of the gyroscopic member as will be described in greater detail below, the rotational dynamics of the aircraft are substantially influenced by the rotational dynamics of the gyroscopic member. Specifically, instead of changing the magnitude of the angular momentum of the aircraft, an external torque acting on the aircraft which is perpendicular to the rotational axis of the gyroscopic member induces the angular momentum of the gyroscopic member to change direction. Thus, when the aircraft is exposed to such external torques, the aircraft will tend to rotate in a manner that eventually results in substantially slow precession of the gyroscopic member. Furthermore, since the rotational axis of the gyroscopic member changes in the direction of the applied torque, the gyroscopic member can be induced into precession within a first plane simply by exposing the aircraft to at least one external force which is perpendicular to the first plane as will be described in greater detail below.

It will also be appreciated that the relatively large angular momentum of the gyroscopic member provides the aircraft with improved stability. In particular, since the gyroscopic member is rotatably mounted to the aircraft and positioned so that its rotational axis is aligned with the roll axis of the aircraft, the aircraft is substantially resistant to a change in attitude along the pitch and yaw axes. Furthermore, since the rate of precession of any spinning object is inversely proportional to the magnitude of its angular momentum, the large angular momentum of the gyroscopic member ensures that the aircraft will most likely experience a relatively small rotational velocity along the pitch and yaw axes.

Thus, when an uncontrollable external torque is applied onto the aircraft, such as that caused by turbulent airflow over the exposed surfaces of the aircraft, the aircraft will react in a relatively slow manner. Consequently, since such torques are usually exerted over relatively short periods of time, the aircraft is less likely to experience a change in attitude that is beyond an uncorrectable threshold level. Moreover, since the average value of such torques over extended periods of time is substantially small, less attitude adjustment is demanded of the control system. Furthermore, since the control system is provided a relatively large reaction time period, the control system is better able to provide attitude correction so that the attitude of the aircraft is more likely to remain within an acceptable range so as to reduce the likelihood that the aircraft will undergo uncontrollable rolling motion along either the pitch or yaw axes.

Hence, in each of the embodiments of the UAV 200, 300 and 400, the aircraft is gyroscopically stabilized such that a control system that controls the flight of the aircraft has more time to respond to changes in orientation of the aircraft as a result of internal or external forces. It will be appreciated that each embodiment of the UAV will incorporate a control system that is adapted to control the vehicle during flight.

Typically, the control system will be comprised of an on-board computer that maintains the UAV in a desired orientation and heading and is also responsive to external commands from a remote location so as to change the orientation and heading of the aircraft. Further, since the UAV's are adapted to provide reconnaissance, the control system is also adapted to orient the camera systems 132 in order to obtain reconnaissance data.

Figure 5A:
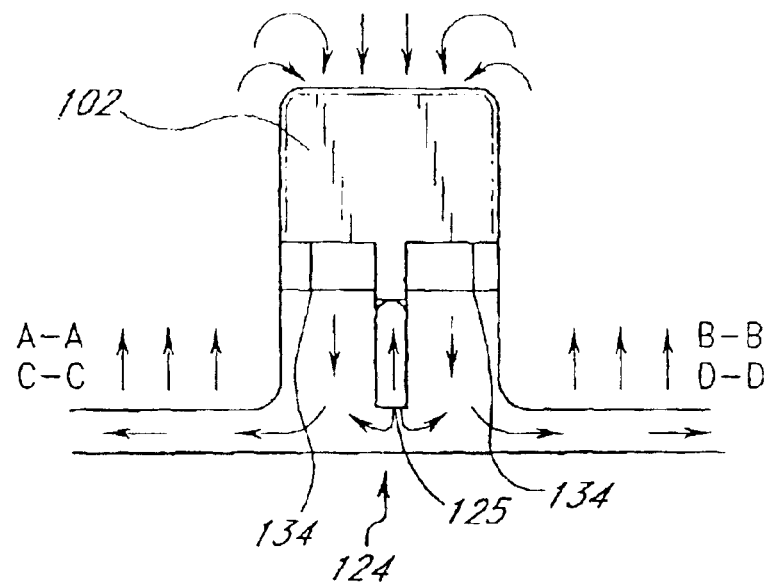
FIGS. 5A and 5B are schematic illustrations illustrating the lift thrust exhaust pattern of the embodiments of the UAV of FIGS. 1–4.
Figure 5B:
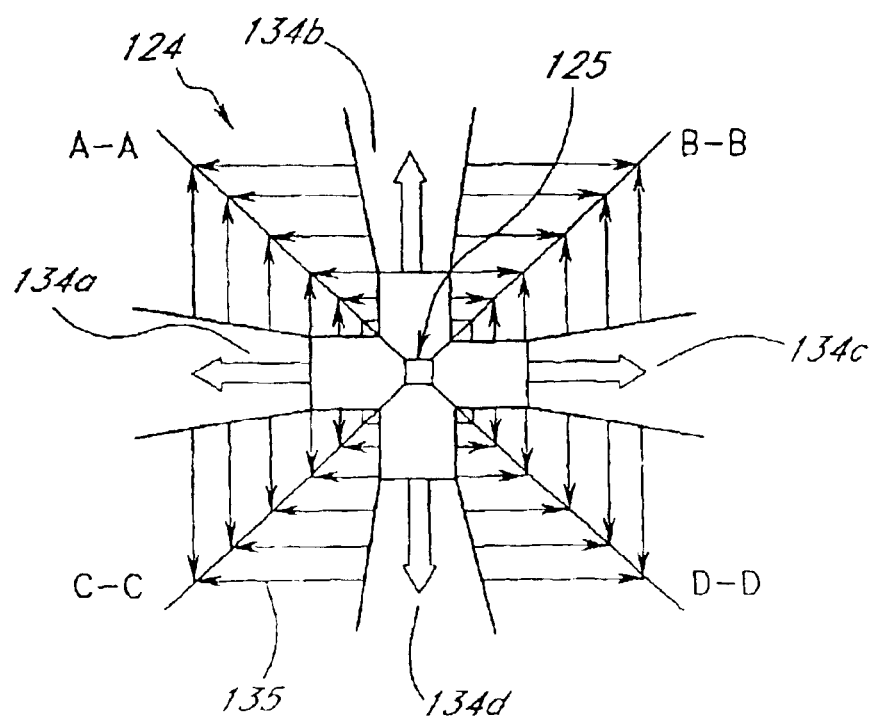

FIGS. 5A and 5B illustrate the configuration of the rear edge 124 of the fuselage 102 and the outlet ports 134a–134d. In the illustrated embodiments, the outlet ports 134a–134d are preferably configured to advantageously direct the thrust from the propeller 114 to overcome ground effects to enable more stable take-offs and landings of the UAV 100. In particular, during vertical flight and in close proximity to the ground, the flow field of the air stream produced by the propeller about the aircraft is very complex with significant unsteady components. The unsteady nature of the flow is caused by wind variations, aircraft perturbations, propeller and rotor blade passage and turbulence resulting from the viscous mixing process.

With prior art ducted fan designs, a circular exit was often used. A circular exit results in the air flow having a finite velocity. Moreover, when the air stream engages with the ground, there is a decreased static pressure around the fuselage which results in a suction effect that holds the vehicle in proximity to the ground inhibiting take-off.

To address these problems, the Applicant has developed the configuration of the outlet ports illustrated in FIGS. 5A and 5B. As illustrated in FIGS. 5A and 5B, there are four exhaust ports 134a through 134d. The thrust from the propeller 114 exhausts out of the ports 134a through 134d and makes contact with the ground. As represented by the flow lines 135 in FIG. 5B, the exhaust then travels laterally over the ground and contacts the exhaust emanating from the adjacent ports 134a through 134d. The meeting lines AA, BB, CC, DD in FIG. 5B illustrate the general plane of intersection of lateral exhaust 135 over the ground. Where the exhaust meets, the exhaust then generates a vertically directed flow in the manner illustrated in FIG. 5A. This vertically directed flow then contacts the surfaces of the rear edge 124 of the fuselage 102 and helps to propel the fuselage upward.

Figure 4A:
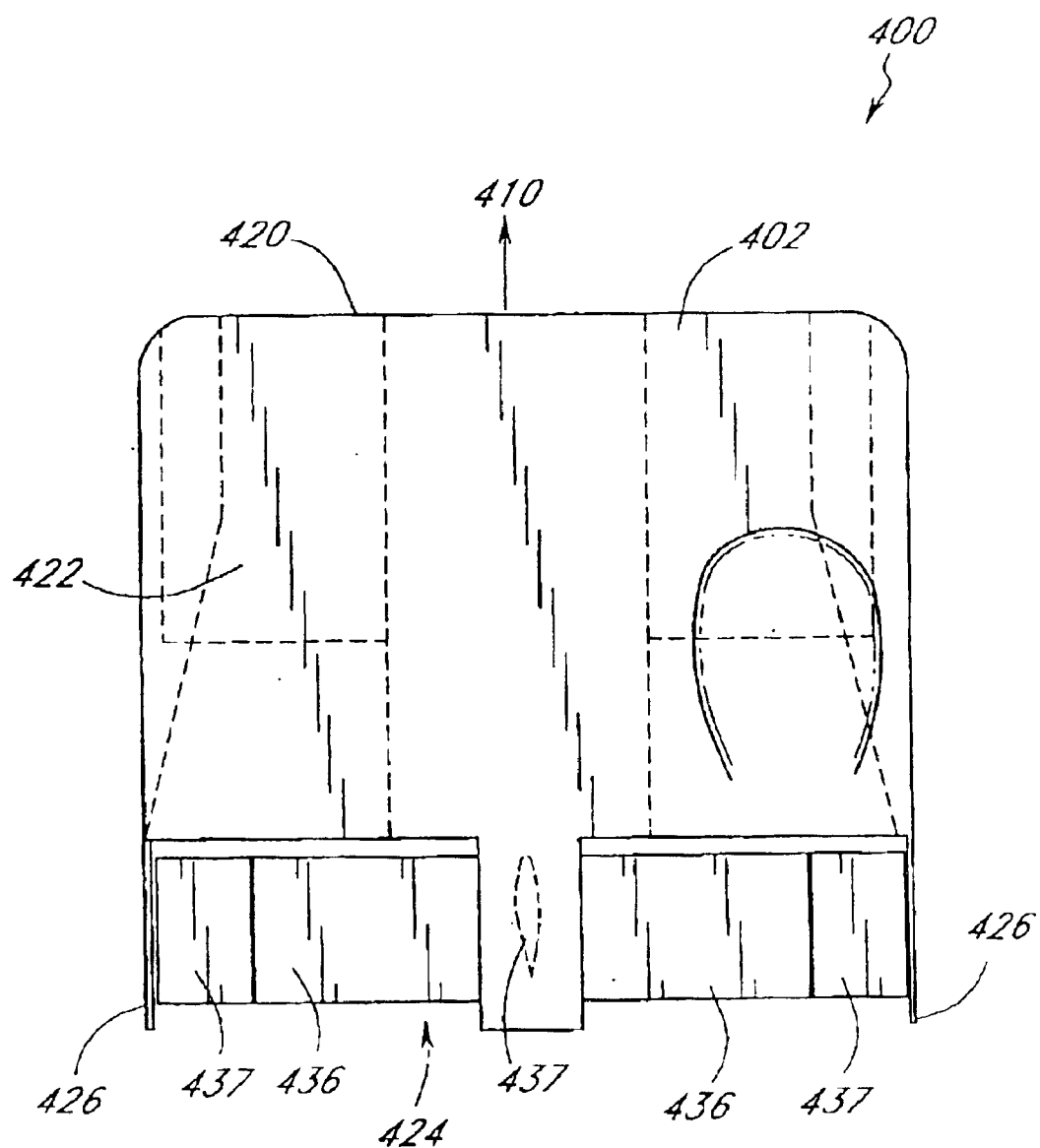
FIGS. 4A through 4E are side, bottom, front, rear and cross-section views of a third embodiment of a UAV of the present invention.
Figure 4B:
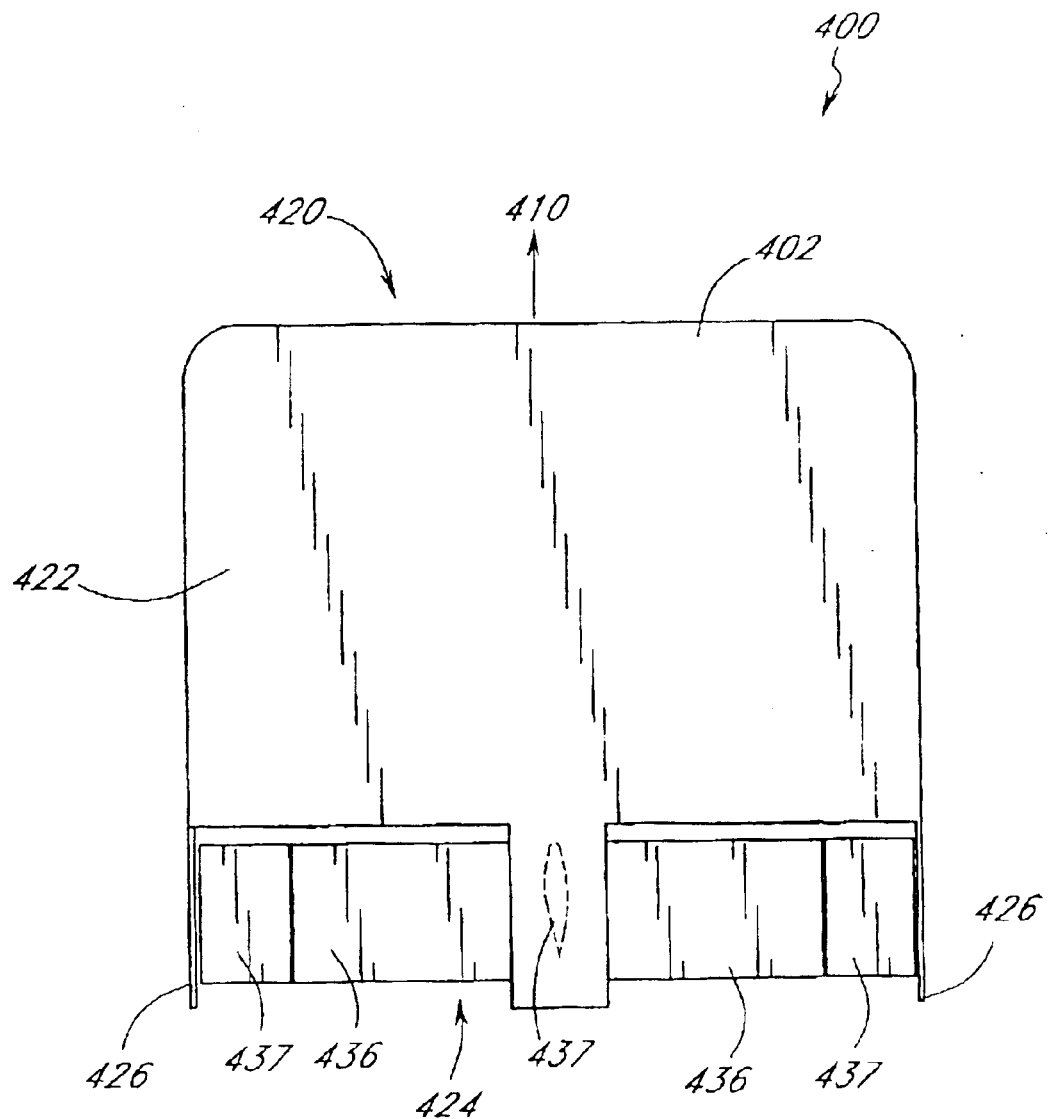
Figure 4C:
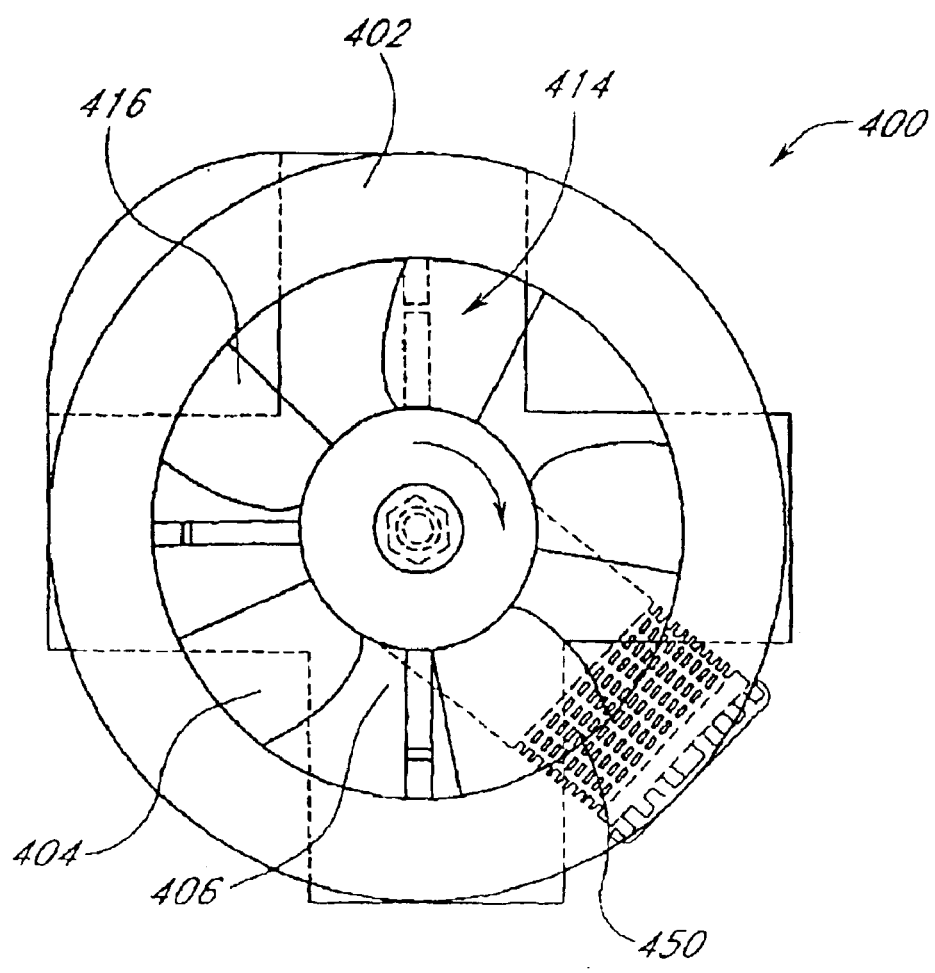
Figure 4D:
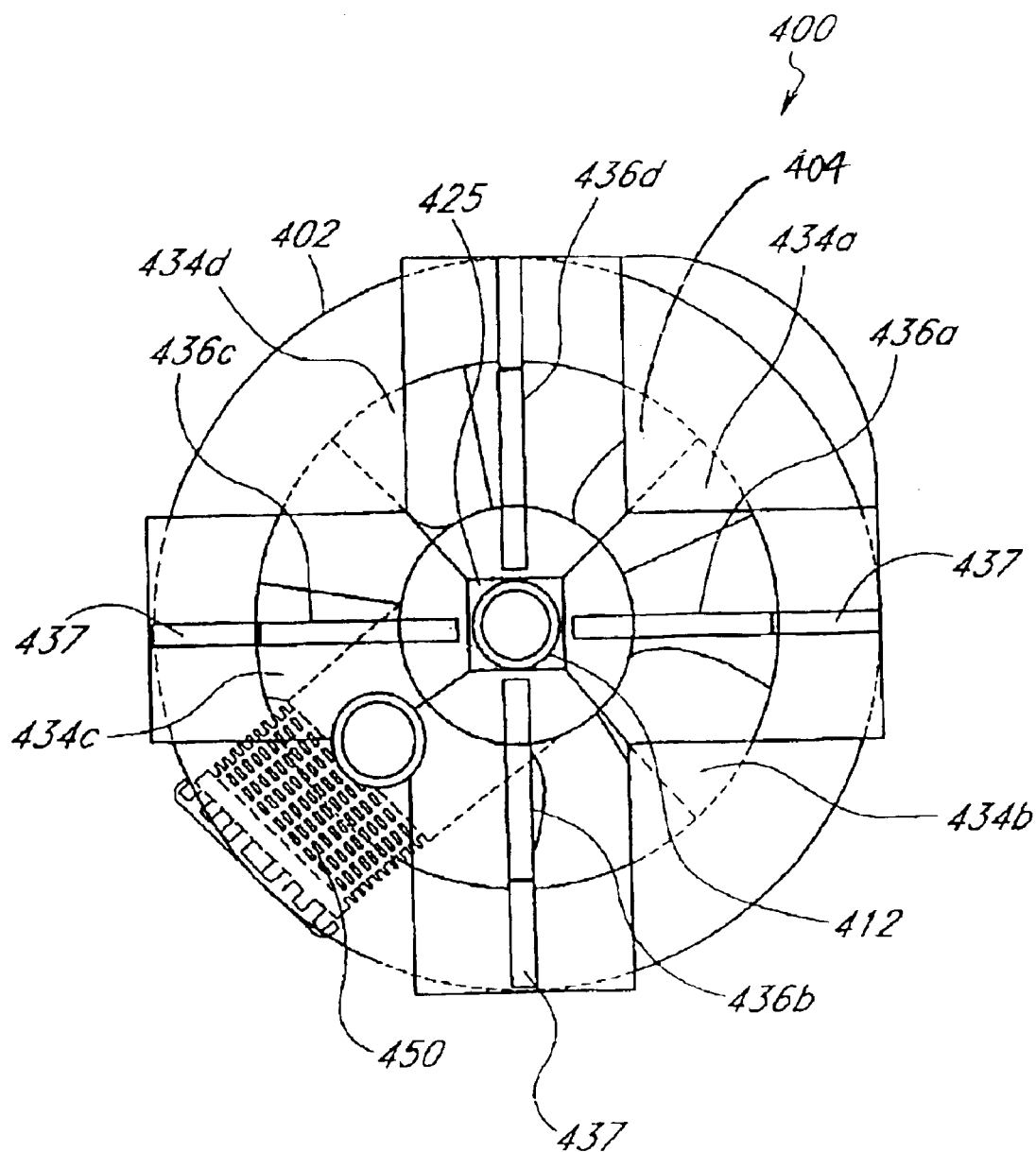
Figure 4E:
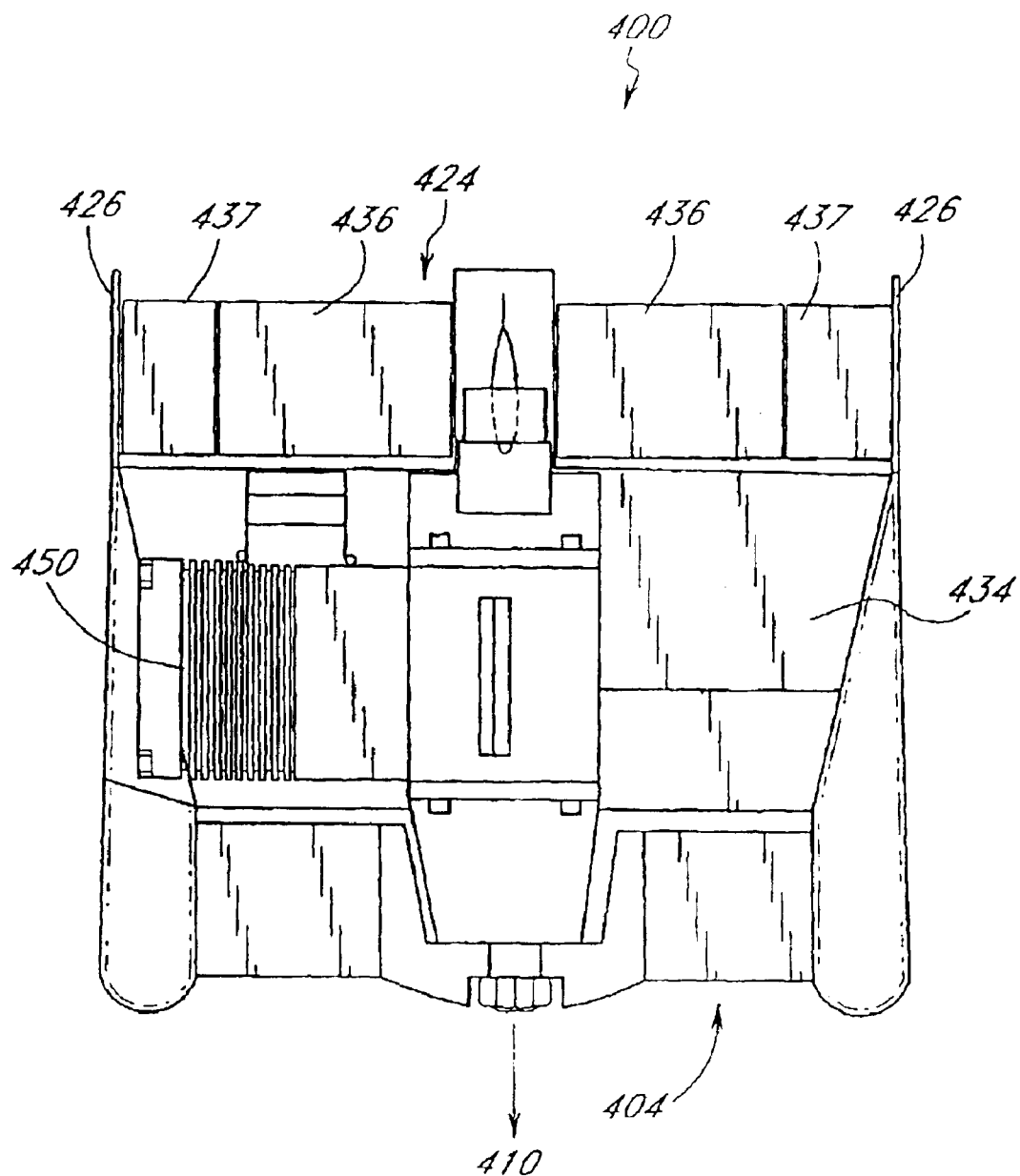

In one embodiment, the rear edge 124 of the fuselage 102 includes a centrally mounted duct center section 125 (not shown) (See, 225, 325 and 425 in FIGS. 2D, 3D, and 4D respectively). The duct center section 125 in each of the preceding embodiments comprises about 40% of the duct diameter and is outlined by four fences which trap the upward jet exhaust pattern causing a positive pressure to urge the aircraft 100 upward. This helps to overcome the suction effect that holds the aircraft in proximity to the ground.

Figure 6:
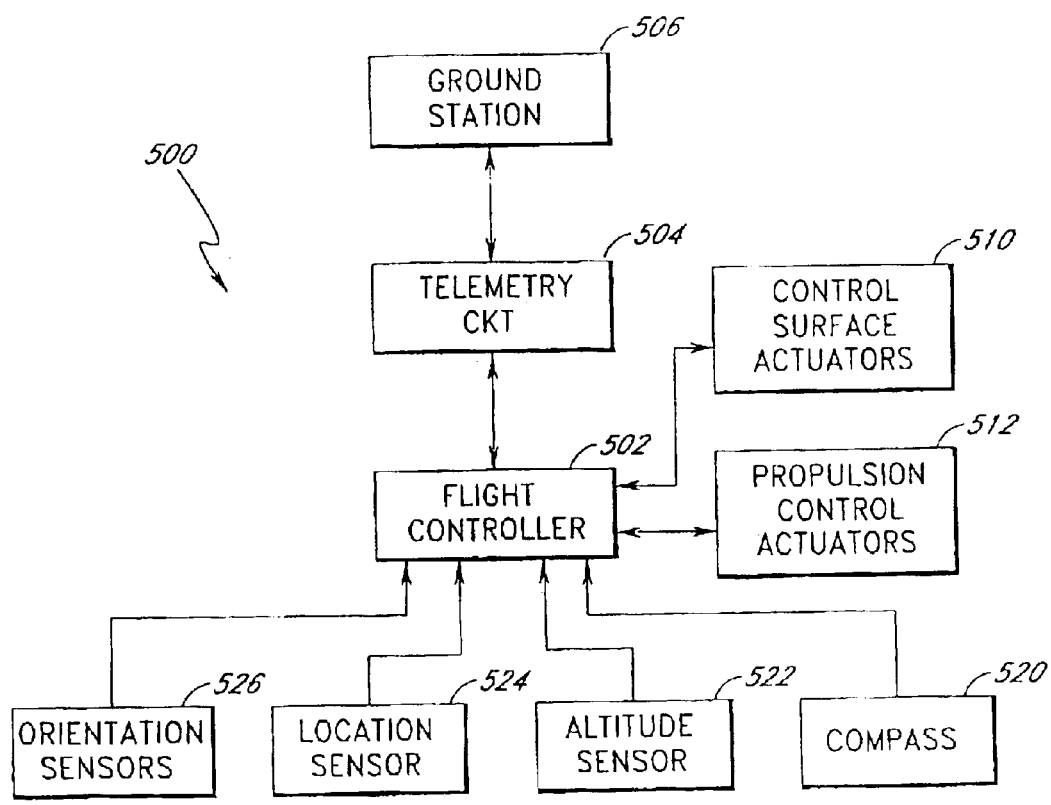
FIG. 6 is a functional block diagram illustrating a basic functional control system of the unmanned air vehicles of the illustrated embodiments.

FIG. 6 is a simplified functional block diagram which illustrates the basic functional configuration of a control system 500 for each of the embodiments of the vehicle. The control system 500 incorporates a controller 502 such as a NSU programmable flight control system manufactured by Marconi Astronics, Inc. of Santa Monica, Calif. The flight controller 502 sends and receives signals via a telemetry circuit 504 to a ground station 506. In one embodiment, the telemetry system is a multi-channel (24 analog, 16 digital) telemetry system. The telemetry system is capable of transmitting telemetry data to the ground station 506 which can be comprised of a PC Base ground station that receives the telemetry data from the flight controller 502 and can be used to provide instructions to the flight controller 502 so as to control the operation of the aircraft. It is contemplated that the aircraft can be operated in either an auto pilot mode or in a manual mode.

The flight controller 502 can also receive a series of input signals from a series of input devices which can include a compass 520, such as a electronic compass module which consists of a 3-axes magneto-meter and a high performance 2-axes tilt sensor. Hence, this type of module also incorporates the orientation sensors 526 that provide the flight controller 502 with an indication as to the orientation of the UAV 100 about the pitch, yaw or roll axes. The flight controller 502 can also receive an altitude indication from an altitude sensor 522 and can further optionally receive a location signal from a location sensor 524 which can, in one embodiment, be comprised of a GPS-based system.

The configuration of the flight systems 500 is simply exemplary of one of a number of different configurations of flight control systems 500 capable of controlling the operation of the UAV 100 and any of the embodiments 200, 300 or 400. Basically, the flight controller 502 is receiving information from onboard sensors indicating the current orientation and flight characteristics of the UAV and is further capable of receiving and sending information to a ground station. In one embodiment, the flight controller 502 receives heading information from the ground station 506 but has onboard control suitable for maintaining a desired orientation or attitude of the aircraft. The flight controller 502 is capable of sending output signals to control surface actuators 510 and two propulsion control actuators 512. As discussed above, the UAV 100 in each embodiment 200, 300 and 400 include four or more control surfaces capable of controlling the orientation of the aircraft about the yaw, pitch and roll axes. Moreover, the propulsion unit (See, 206, 306 and 406 in FIGS. 2x, 3x and 4x) can be controlled either by increasing the speed of operation of the engine or, in the embodiments where the speed of operation of the engine is fixed, by varying the pitch angle of the propellers to increase or decrease the degree of thrust produced by the propeller of the vehicle.

The exact implementation and operation of the control system will, of course, be substantially similar to known control systems of the prior art. However, the flight controller 502 is programmed to sense when the orientation of the aircraft about the pitch roll or yaw axes has moved from a desired orientation as a result of either internal or external forces acting upon the vehicle. Due to the fact that the UAV 100 is gyroscopically stabilized, and that the ratio of angular momentum to the moment of inertia is at least 30, the speed at which an internal or external force will result in a substantial change in the heading of the aircraft is also slowed down approximately 30 or more times. The flight control system 500 thus can be programmed to delay taking corrective action to maintain the desired orientation of the aircraft as the control system has more time to take the necessary corrective action. In particular, the control system 500 can be programmed to take corrective action only when the threshold change in the orientation of the aircraft exceeds a preselected minimum. The preselected minimum can, of course, be selected to be higher than what otherwise would be required in systems of the prior art due to the fact that the rate of change of the orientation of the UAV is decreased due to the gyroscopic stabilization. As a consequence, the aircraft is more stable in operation and the necessity of applying sudden corrections and sudden movements of the control surfaces is reduced as the rate of change of orientation of the aircraft as a result of external forces is decreased.

FIGS. 7A through 7C illustrate the positioning of the control surfaces 136a through 136d in order to effectuate movement about the three axes of the aircraft 100. In particular, it should be appreciated that, due to the precession of the aircraft as a result of the gyroscopic stabilization, an external or internal force applied to the aircraft, such as the force resulting from changing the profile of the flight control surfaces 136a–136d in the thrust exhaust of the propeller 114, is manifested ahead 90 degrees in the direction of rotation. As a consequence, the orientation of the control surfaces 136a–136d has to be similarly adjusted to achieve a desired movement about the pitch and yaw axes. Hence, the control system 500 has to be programmed such that a change in a desired direction takes into account the gyroscopic stabilization and the resulting precession of the aircraft.

FIG. 7A illustrates the direction at which the control surfaces 136e through 136d have to change in order to effectuate the stability of aircraft about the roll axis which is coincident with the longitudinal axis 110 of the fuselage 102 which, in this figure, is extending out of the page. In order to counteract the tendency of the aircraft to rotate in a counterclockwise direction as a result of the clockwise rotation of the propeller 114 (see FIG. 1), each of the control surfaces 136a–136d has to be pivoted in the directions of the arrows 180 so that a greater surface area is exposed to the thrust from the propeller 114 so as to counteract the tendency of the fuselage 102 (see FIG. 1) to rotate in the counterclockwise direction in response to the clockwise torque of the propeller 114. It will he appreciated that increasing the angle of the control surfaces 136a–136d in the direction of the arrows 180 will result in a roll of the fuselage 102 of the aircraft in the counterclockwise direction. Similarly, causing the control surfaces 136a–136d to be pivoted in the opposite direction, i.e. in the direction of the arrows 181, will cause the aircraft to rotate in a clockwise direction in thereby roll in a clockwise direction.

FIG. 7B illustrates the orientation of the control surfaces 136a through 136d needed to effectuate the pitch of the aircraft 100. Pitch is the longitudinal change of the of the aircraft about a vertical axis that is perpendicular to the longitudinal axis 110 of the aircraft. In effect, the forward edge 120 (see FIG. 1) of the fuselage is moving either up or down with respect the rear edge 124 of the fuselage 102 (see both in FIG. 1). Due to the gyroscopic precession, the control surfaces 136b and 136d, i.e. the vertical control surfaces in this particular orientation of the aircraft 100 (see FIG. 1), must be moved either left or right in order to effectuate a change in pitch of the aircraft. In particular, moving the control surfaces 136b and 136d in a direction 184 such that a larger surface area of the control surfaces 136b and 136d are exposed to the thrust emanating from the propeller 114 which thereby imparts a force on the rear of the aircraft which, in the absence of precession, will result in the aircraft yawing from left to right. However, due to the precession of the aircraft, this results in the forward edge 120 of the fuselage 102 moving up with respect to the rear edge 124. Similarly, moving the control surfaces 136b and 136d in the direction 185 will result in the forward edge 120 of the fuselage 102 dipping downward with respect to the rear edge 124 of the fuselage 102.

Lastly, FIG. 7C illustrates the orientation of the control surfaces 136a–136d necessary to effectuate a yaw, i.e. a change in orientation about an axis perpendicular to the longitudinal axis 110 of the fuselage with the forward edge 120 of the fuselage 102 and the rear edge 124 of the fuselage 102 maintaining substantially the same vertical orientation with respect to each other. In particular, in order to induce a yaw from left to right, the control surfaces 136a and 136c have to be moved in the direction 190 so that a greater surface area of the control surface is exposed to the thrust in the direction of the arrows 190 so as to exert a downward force in the rear of the aircraft 100. Similarly, to get the aircraft 100 to yaw from right to left, the control surfaces 136a and 136c must be moved in the opposite direction, i.e. in the direction of the arrows 191.

From the foregoing description, it will be apparent that the control system 500 (See FIG. 6) must control the aircraft with the anticipation that the control surfaces 136a–136d must account for the 90 degree change in the orientation of the aircraft as a result of precession. Naturally, it will he appreciated that the exact configuration and orientation of the control system will vary depending upon the orientation of the aircraft.

Figure 8:
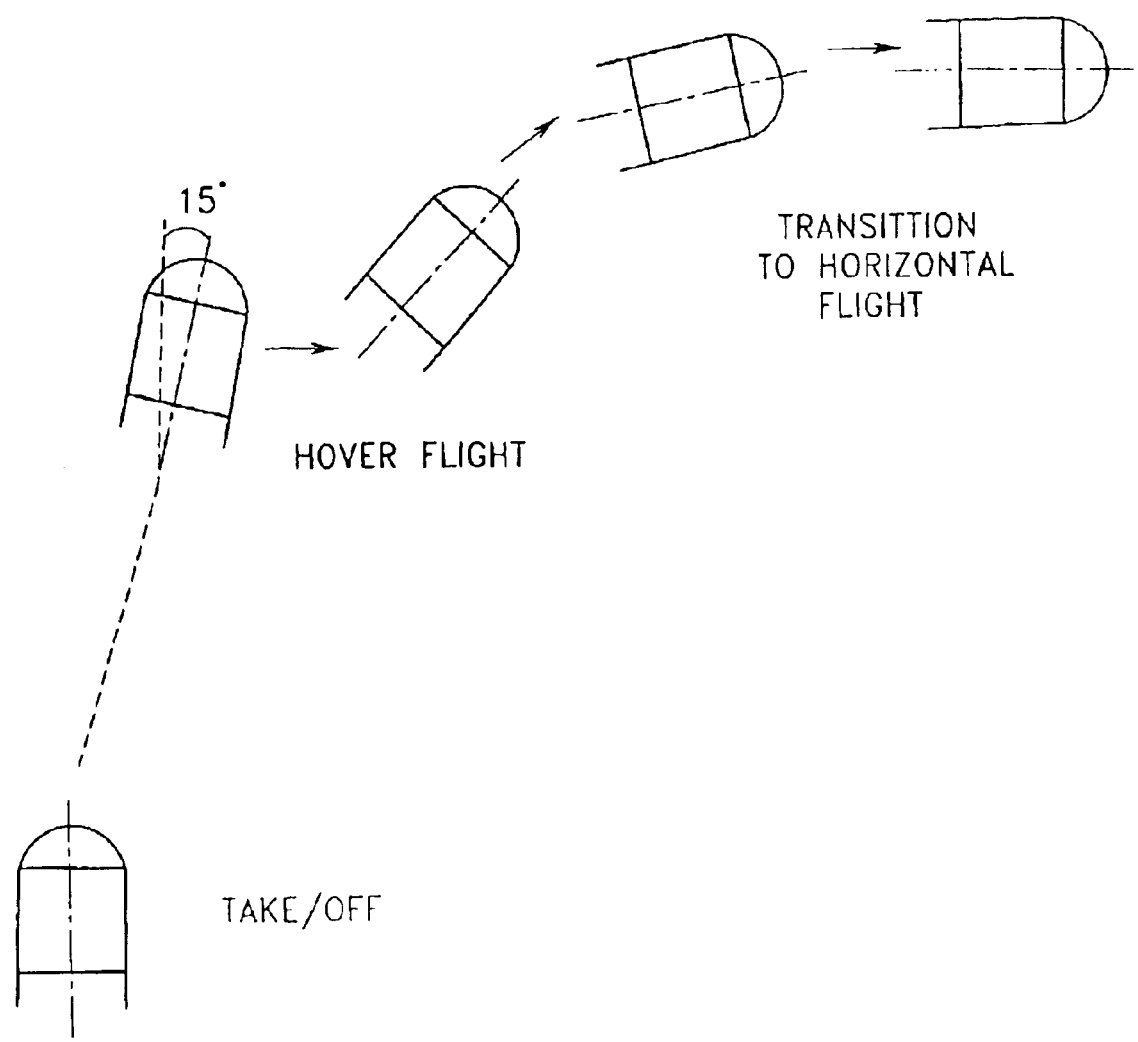
FIG. 8 is a schematic illustration illustrating the basic components of the flight profile of the UAV's of the illustrated embodiments.

Hence, the stability of the aircraft is enhanced as a result of having a gyroscopic stabilization member that translates any force exerted against the aircraft into gyroscopic precession, i.e. a change in the angular orientation of the aircraft. The relatively slow rate of change in the orientation of the aircraft allows for greater stability which thereby allows the aircraft 100 to more successfully transition from vertical flight to substantially horizontal flight in the manner shown in FIG. 8. In particular, FIG. 8 illustrates the basic flight envelope of the aircraft described as follows with joint reference to FIG. 1. The aircraft 100 is designed to take off and land in a generally vertical orientation off of the landing struts 126. After leaving the ground, the aircraft can then tilt in a particular direction with the longitudinal axis 110 being approximately 10 to 15 degrees from a perpendicular axis in the manner shown in FIG. 7. This results in the aircraft traveling forward in a hover mode with the inner surfaces of the opening 104 of the fuselage 102 forming the flight surfaces in a well-known manner. It will, however, be appreciated that, as the speed of the aircraft is increased in the hover mode, turbulence will result in the aircraft no longer having sufficient airflow to maintain steady flight. Consequently, ducted fan aircrafts have a maximum horizontal flight speed in the hover mode. Moreover, due to the instability associated with these particular aircraft, ducted fan aircraft have been unable to make the transition to full horizontal flight wherein the longitudinal axis 110 is substantially parallel to the plane of the earth or, alternatively, the plane of rotation of the propeller 114 is substantially perpendicular to the plane of the earth.

It will be appreciated that the inability of ducted fan aircraft to travel in a horizontal mode limits the upper speed of the aircraft which, in combat environments, can be too slow to protect the aircraft. By gyroscopically stabilizing the aircraft, the Applicant is capable of producing an aircraft that will make the transition from vertical flight or hover flight into substantially horizontal flight. This is due to the increase in the angular momentum of the aircraft and the fact that the rate of change in the angular orientation of the aircraft due to external forces is decreased approximately by the ratio of the angular momentum to the moment of inertia of the aircraft. Hence, due to the increased stability, the Applicant can fly a ducted fan configuration of aircraft in a vertical mode, a hover mode and a horizontal mode.

Although the preferred embodiment of the present invention has shown, described, and pointed out the fundamental novel features of the invention, it will be understood the various omissions, substitutions and changes in the form of the detail of the device illustrated may be made by those skilled in the art without departing from the spirit of the present invention. Consequently, the scope of the invention should not be limited to the foregoing description but is to be defined by the appended claims.

What is claimed is:

1. An aircraft for vertical, horizontal and/or stationary flight, comprising:
   a ducted fan fuselage;
   a plurality of control surfaces attached to the fuselage for controlling the flight of the aircraft;
   an engine mounted to the fuselage having an engine shaft that extends longitudinally and is arranged to rotate about a longitudinal axis of the aircraft in a first rotational direction;
   a propeller, comprising a plurality of blades, mounted to the engine shaft so as to rotate in the first rotational direction that produces sufficient thrust to thereby induce the aircraft into flight and such that air flow is created over the plurality of control surfaces wherein the engine provides sufficient thrust via the propeller so as to power the aircraft through flight envelope that includes vertical take off and landing and horizontal flight and transitions therebetween; and
   a gyroscopic stabilization ring structure attached circumferentially around the blades of the propeller such that the ring structure rotates with the rotation of the propeller in the first rotational direction with an angular momentum that is selected, with respect to the moment of inertia of the aircraft about at least one axis perpendicular to the first rotational direction, such that the aircraft is gyroscopically stabilized during flight as the ring structure rotates;
   wherein the ring structure is situated in a recessed formation in an opening of the ducted fan fuselage.

2. The aircraft of claim 1, wherein the ring structure in its entirety is situated in the recessed formation of the ducted fan fuselage.

3. The aircraft of claim 1, wherein the ring structure is without a portion extending into the opening of the ducted fan fuselage.

4. The aircraft of claim 1, wherein the ring structure is adapted to move within the recessed formation of the opening of the ducted fan fuselage without mechanical contact or magnetic interact on with the recessed formation.

5. The aircraft of claim 1, wherein the opening has a plurality of exhaust openings and wherein the plurality of control surfaces are mounted within the plurality of exhaust openings.

6. The aircraft of claim 5, wherein the plurality of exhaust openings comprise exhaust openings arranged about the longitudinal axis of the aircraft such that discrete openings direct thrust towards the ground during vertical take-off much that the thrust from adjacent exhaust opening combine and produce an upwardly directed force against the aircraft so as to improve take-off performance of the aircraft.

7. The aircraft of claim 5, wherein the plurality of exhaust opening comprise four exhaust openings and wherein the plurality of control surfaces include a main plurality of control surfaces that can be manipulated to control the flight of the aircraft about a pitch axis perpendicular to the longitudinal axis of the aircraft and a yaw axis that is perpendicular to both the longitudinal axis of the aircraft and the pitch axis.

8. The aircraft of claim 1, wherein the plurality of control surfaces are adapted to be positioned so as to control the flight of the aircraft about a roll axis that is coincident with the longitudinal axis of the aircraft.

9. The aircraft of claim 1, wherein the ring structure is selected to have an angular momentum such that a first ratio of the angular momentum to the moment of inertia of the aircraft is at least about 30.

10. The aircraft of claim 1, wherein the aircraft is gyroscopically stabilized about a pitch axis and a yaw axis such that external forces exerted on aircraft during flight result in precession of the aircraft such that the angular position of the roll axis changes at a rate that is approximately inversely proportional to the first ratio.

11. The aircraft of claim 1, further comprising a control system that controls the control surfaces, wherein the control surface controls the aircraft through a flight that includes vertical flight wherein the plane of rotation of the propeller is substantially parallel to the ground and horizontal flight wherein the plane of rotation of the propeller is substantially perpendicular to the ground.

* * * * *

UNITED STATES PATENT AND TRADEMARK OFFICE
CERTIFICATE OF CORRECTION

PATENT NO.        : 7,044,422 B2                                      Page 1 of 1
APPLICATION NO. : 10/390222
DATED             : May 16, 2006
INVENTOR(S)       : Bostan It is certified that error appears in the above-identified patent and that said Letters Patent is hereby corrected as shown below:

On the Title Page
Item (76) Inventor:              After "Cypress Ave.,",
                                 Insert --Unit 51--

Title Page
Item (63) Related U.S.           After "6,604,706",
Application Data                 Insert --, filed as 371 of international application No.
                                 PCT/US99/19641, filed August 27, 1999--

Signed and Sealed this

Thirteenth Day of February, 2007

JON W. DUDAS
*Director of the United States Patent and Trademark Office*